United States Patent
Song

(10) Patent No.: US 8,545,601 B2
(45) Date of Patent: Oct. 1, 2013

(54) TWO-STAGE COMPLETE RECYCLE PRESSURE-SWING ADSORPTION PROCESS FOR GAS SEPARATION

(76) Inventor: Yuwen Song, Chengdu (CN)

( * ) Notice: Subject to any disclaimer, the term of this patent is extended or adjusted under 35 U.S.C. 154(b) by 1491 days.

(21) Appl. No.: 11/570,312

(22) PCT Filed: May 9, 2005

(86) PCT No.: PCT/CN2005/000641
§ 371 (c)(1), (2), (4) Date: Apr. 25, 2007

(87) PCT Pub. No.: WO2005/120681
PCT Pub. Date: Dec. 22, 2005

(65) Prior Publication Data
US 2007/0221060 A1    Sep. 27, 2007

(30) Foreign Application Priority Data
Jun. 11, 2004  (CN) .......................... 2004 1 0046598

(51) Int. Cl.
*B01D 59/26*  (2006.01)
(52) U.S. Cl.
USPC ..................... 95/96; 95/100; 95/103; 96/130
(58) Field of Classification Search
USPC ................. 95/96, 100, 103; 96/130
See application file for complete search history.

(56) References Cited

U.S. PATENT DOCUMENTS

| | | | |
|---|---|---|---|
| 5,547,492 A * | 8/1996 | Cho et al. ........................ | 95/100 |
| 5,993,517 A | 11/1999 | Chen et al. | |
| 6,102,985 A | 8/2000 | Naheiri et al. | |

FOREIGN PATENT DOCUMENTS

| | | |
|---|---|---|
| CA | 2183832 | 2/1997 |
| CN | 1215627 | 5/1999 |
| CN | 1347747 | 5/2002 |

* cited by examiner

*Primary Examiner* — Robert A Hopkins
(74) *Attorney, Agent, or Firm* — Michael Best & Friedrich LLP

(57) ABSTRACT

A two-stage complete recycle pressure-swing adsorption process for gas separation features that separating more adsorptable component and less adsorptable component from gas mixture, and the product is more adsorptable component or less adsorptable component or both of them. Serially-connected operation of two-stage pressure-swing adsorber is employed. The gas mixture is fed into the first stage pressure-swing adsorption gas separation system, and the more adsorptable component of the gas mixture is absorbed, then is abstracted into product. The semifinished gas mixture from the outlet of the first stage pressure-swing adsorption tower is fed into the second stage pressure-swing adsorption gas separation system. The more adsorptable component of the semi-finished gas mixture is absorbed further, and the less adsorptable component is fed into next stage. The gas in the second stage pressure-swing adsorption gas separation system except for the less adsorptable component fed into next stage is reintroduced into the first stage pressure-swing adsorption gas separation system to increase pressure. The first stage pressure-swing adsorption tower in one cyclic period comprises the steps in turn: the adsorption step A, tow-end pressure-equalizing and reduction 2ED', converse pressure-reduction BD, two-stage gas pressure-boosting 2ER, two-end pressure-equalizing and boosting 2ER' and final boosting FR. The second stage pressure-swing adsorption tower in one cyclic period comprises the steps in turn: the adsorption step A, sequence pressure-equalizing and reduction ED, converse pressure-reduction BD, converse pressure-equalizing and boosting ER and final boosting FR.

28 Claims, 2 Drawing Sheets

TWO-STAGE COMPLETE RECYCLE PRESSURE-SWING ADSORPTION PROCESS FOR GAS SEPARATION

TECHNICAL FIELD

The present invention involves a two-stage complete recycle pressure-swing adsorption process for gas separation using two-stage pressure swing adsorption gas separation technology. It belongs to the field of pressure swing adsorption gas separation.

BACKGROUND OF THE INVENTION

It is well known that the former pressure swing gas separation technology usually has the following disadvantage whether obtaining the product from the strongly adsorbed phase (e.g. this technology has been employed to produce pure carbon dioxide from the strongly adsorbed phase.) or obtaining the product from the weakly adsorbed phase (e.g. this technology has been employed to produce pure hydrogen from the weakly adsorbed phase) or obtaining the product from both of the weakly adsorbed and the strongly adsorbed phase (e.g. this technology has been also applied in the production of carbamide from synthetic ammonia shift gas by removing carbon). These kinds of the patents include CN 1235862A, CN1248482A, CN1357404A CN1347747A, CN1342509A, CN1334135A and CN1334136A, etc. However it has been seen that the conventional pressure-swing gas adsorption technology possesses significant disadvantages in terms of the lost of the effective gases and the high operation cost, etc. The present invention involves improvements based on the pressure-swing adsorption gas separation technology mentioned above, namely, in this invention there is almost no lost of the effective gas, and in addition, this invention does not need the complicated vacuum facilities under suitable adsorption pressure. Therefore, the cost of the equipment and the power consumption will be remarkably reduced.

SUMMARY OF THE INVENTION

The present invention adopts the two-stage pressure swing adsorption process to separate the strongly adsorbed and the weakly adsorbed component from the gas mixture, and the product may be the strongly adsorbed component or the weakly adsorbed component or both of them at the same time. In the present invention, the strongly adsorbed and the weakly adsorbed is relative and isn't absolute, that means that the same component is the strongly adsorbed component in one gas mixture, but it is the weakly adsorbed component in another gas mixture. In order to achieve different goals, the same component even if in the same gas mixture may be the strongly adsorbed component or may be the weakly adsorbed component; moreover, the strongly adsorbed component and the weakly adsorbed component in the invention may be a single component or may be sum of several components. For example, in the synthetic ammonia shift gas, it contains hydrogen sulfide, organic sulphur, gaseous water, carbon dioxide, methane, carbon monoxide, nitrogen, oxygen, argon and hydrogen, etc. When this mixture is utilized to produce carbamide, the hydrogen sulfide, the organic sulphur, the gaseous water, and the carbon dioxide are called strongly adsorbed components; the methane, the carbon monoxide, the nitrogen, the oxygen, the argon and the hydrogen are called the weakly adsorbed components. When this mixture is utilized to produce the high pure hydrogen (99.99 v %), the hydrogen sulfide, the organic sulphur, the gaseous water, the carbon dioxide, the methane, the carbon monoxide, the nitrogen, the oxygen and the argon are called strongly adsorbed components, but the hydrogen is called the weakly adsorbed component. Here in the above statement, the nitrogen in the synthetic ammonia shift gas is called weakly adsorbed component when it is utilized to produce carbamide, but it is called strongly adsorbed component when it is utilized to produce high pure hydrogen (99.99 v %). The methane, the carbon monoxide, the nitrogen, the oxygen are the same too.

The aim of the present invention is to provide a kind of gas Separation process which has low investment and lower operation cost using two-stage complete recycle pressure swing adsorption. The process can overcome the disadvantages of the prior art by adopting the combination of different equipments and adsorbents, and can save the operation cost largely and reduce the effective gas loss at maximum extent comparing with the prior art.

The present invention adopts the two-stage complete recycle pressure swing adsorption process for gas separation. The process is used to separate the strongly adsorbed component and the weakly adsorbed component from the gas mixture; the product can be the strongly adsorbed component or the weakly adsorbed component or both of them at the same time; the process adopts two-stage pressure-swing adsorption device operating in series; the gas mixture is fed into the first stage pressure-swing adsorption device, and the strongly adsorbed component of the gas mixture is adsorbed and is concentrated as product; the interim gas mixture from the outlet of the adsorption tower of the first stage pressure-swing adsorption device is fed into the second stage pressure-swing adsorption device; the strongly adsorbed component in the interim gas mixture is adsorbed further, and the nonadsorbed weakly adsorbed component acts as product and is fed into next step; all of the gas excepting for the weakly adsorbed component entering into next step in the second stage is returned into the first stage to increase the pressure of the adsorption tower; the adsorption tower of the first stage sequentially undergoes the following steps in one circulation period: adsorption step A, two-end equalization depressurization 2ED', backward depressurization BD, second stage gas repressurization 2ER, two-end equalization repressurization 2ER' and final repressurization FR; the adsorption tower of the second stage sequentially undergoes the following steps in one circulation period: adsorption A, cocurrent equalization depressurization ED, backward depressurization BD, backward equalization repressurization ER and final repressurization FR.

The adsorption tower of the first stage adds the cocurrent equalization depressurization ED step after the adsorption A step; at the same time, the adsorption tower of the first stage adds the backward equalization repressurization ER step after the two-end equalization repressurization 2ER'.

The adsorption tower of the first stage adds the evacuation step VC after the backward depressurization step BD or/and the adsorption tower of the second stage adds the evacuation step VC after the backward depressurization step BD.

The adsorption tower of the second stage adds the cocurrent depressurization step PP after the cocurrent equalization depressurization ED; at the same time, the adsorption tower of the second stage adds the purge step P after the backward depressurization step BD; the gas of the purge step P comes from the adsorption tower which is in the cocurrent depressurization step PP directly or comes from the buffer vessel V that is used to store the gas of the cocurrent depressurization step PP.

The adsorption tower of the second stage adds the first cocurrent depressurization step PP1 and the second cocurrent depressurization step PP2 after the cocurrent equalization depressurization step ED; at the same time, the adsorption tower of the second stage adds the first purge step P1 and the second purge step P2 after the backward depressurization step BD; the gas of the first purge step P1 comes from the adsorption tower which is in the second cocurrent depressurization step PP2 directly or comes from the buffer vessel V1 that is used to store the gas of the second cocurrent depressurization step PP2; the gas of the second purge step P2 comes from the adsorption tower which is in the first cocurrent depressurization step PP1 directly or comes from the buffer vessel V2 that is used to store the gas of the first cocurrent depressurization step PP1.

The adsorption tower of the second stage adds the first cocurrent depressurization step PP1 and the second cocurrent depressurization step PP2 and the third cocurrent depressurization step PP3 after the cocurrent equalization depressurization step ED; at the same time, the adsorption tower of the second stage adds the first purge step P1 and the second purge step P2 and the third purge step P3 after the backward depressurization step BD; the gas of the first purge step P1 comes from the adsorption tower which is in the third cocurrent depressurization step PP3 directly or comes from the buffer vessel V3 that is used to store the gas of the third cocurrent depressurization step PP3; the gas of the second purge step P2 comes from the adsorption tower which is in the second cocurrent depressurization step PP2 directly or comes from the buffer vessel V4 that is used to store the gas of the second cocurrent depressurization step PP2; the gas of the third purge step P3 comes from the adsorption tower which is in the first cocurrent depressurization step PP1 directly or comes from the buffer vessel V5 that is used to store the gas of the first cocurrent depressurization step PP1.

In the first stage, the average concentration of the strongly adsorbed components in the gas mixture finally discharged from the top of the adsorption tower after the two-end equalization depressurization step 2ER' is over 30%.

In the first stage, the average concentration of the strongly adsorbed components in the gas mixture finally discharged from the top of the adsorption tower after the two-end equalization depressurization step 2ER' is over 75%.

In the first stage, the average concentration of the strongly adsorbed components in the outlet gas of the adsorption step is over or equal to 2 v %.

The gas discharged from the adsorption tower is discharged into the buffer vessel V6 at first and then the buffer vessel V7 when the adsorption tower is performing the backward depressurization step BD in the second stage.

When the adsorption tower of the first stage is performing the two-end equalization depressurization step, less than 50% of the gas discharged from the equalization depressurization step is introduced from the bottom of the adsorption tower into the other adsorption tower which is performing the equalization repressurization step.

When the adsorption tower of the first stage is performing the two-end equalization depressurization step, 17-25% of the gas discharged from the equalization depressurization step is introduced from the bottom of the adsorption tower into the other adsorption tower which is performing the equalization repressurization step.

The present invention is used to separate the strongly adsorbed component and the weakly adsorbed component from the gas mixture; the product can be the strongly adsorbed component or the weakly adsorbed component or both of them at the same time; the process adopts two-stage pressure-swing adsorption device operating in series; the gas mixture is fed into the first stage pressure-swing adsorption device, and the strongly adsorbed component of the gas mixture is adsorbed and is concentrated as product; the interim gas mixture from the outlet of the adsorption tower of the first stage pressure-swing adsorption device is fed into the second stage pressure-swing adsorption device; the strongly adsorbed component in the interim gas mixture is adsorbed further, and the nonadsorbed weakly adsorbed component acts as product and is fed into next step; the gas discharged from the adsorption tower which is in the first backward depressurization step BD1 in the first stage is returned into the adsorption tower of the first stage at the bottom to increase the pressure; all of the gas excepting for the weakly adsorbed component entering into next step in the second stage is returned into the first stage to increase the pressure of the adsorption tower; the adsorption tower of the first stage sequentially undergoes the following steps in one circulation period: adsorption step A, cocurrent equalization depressurization ED, first backward depressurization BD1, second backward depressurization BD2, first stage gas repressurization 2ER1, second stage gas repressurization 2ER, backward equalization repressurization ER and final repressurization FR; the adsorption tower of the second stage sequentially undergoes the following steps in one circulation period: adsorption A, cocurrent equalization depressurization ED, backward depressurization BD, backward equalization repressurization ER and final repressurization FR.

The adsorption tower of the first stage adds the evacuation step VC after the second backward depressurization step BD2 and/or the adsorption tower of the second stage adds the evacuation step VC after the backward depressurization step BD. The adsorption tower of the second stage adds the first cocurrent depressurization step PP1 and the second cocurrent depressurization step PP2 and the third cocurrent depressurization step PP3 after the cocurrent equalization depressurization step ED; at the same time, the adsorption tower of the second stage adds the first purge step P1 and the second purge step P2 and the third purge step P3 after the backward depressurization step BD; the gas of the first purge step P1 comes from the adsorption tower which is in the third cocurrent depressurization step PP3 directly or comes from the buffer vessel V3 that is used to store the gas of the third cocurrent depressurization step PP3; the gas of the second purge step P2 comes from the adsorption tower which is in the second cocurrent depressurization step PP2 directly or comes from the buffer vessel V4 that is used to store the gas of the second cocurrent depressurization step PP2; the gas of the third purge step P3 comes from the adsorption tower which is in the first cocurrent depressurization step PP1 directly or comes from the buffer vessel V5 that is used to store the gas of the first cocurrent depressurization step PP1.

In the first stage, the average concentration of the strongly adsorbed components in the gas mixture finally discharged from the top of the adsorption tower after the two-end equalization depressurization step 2ER' is over 40%.

In the first stage, the average concentration of the strongly adsorbed components in the gas mixture finally discharged from the top of the adsorption tower after the two-end equalization depressurization step 2ER' is over 75%.

In the first stage, the average concentration of the strongly adsorbed components in the outlet gas of the adsorption step is over or equal to 2 v %.

The pressure of the raw material gas mixture is over or equal to 1.8 MPa(G).

In the first stage, the average concentration of the strongly adsorbed components in the gas mixture finally discharged from the adsorption tower after the first backward depressurization step BD1 is over 30%.

In the first stage, the average concentration of the strongly adsorbed components in the gas mixture finally discharged from the adsorption tower after the first backward depressurization step BD1 is over 80%.

The adsorbents in the adsorption tower of the first stage are activated alumina and fine-porous-silicagel; the activated alumina is packed at the bottom of the adsorption tower; the fine-porous-silicagel is packed at the top of the adsorption tower; the adsorbent in the adsorption tower of the second stage is fine-porous-silicagel only.

The adsorbents in the adsorption tower of the first stage are activated alumina and fine-porous-silicagel, or activated alumina and activated carbon, or activated alumina and activated carbon and molecular sieve in sequence from the bottom up; the adsorbents in the adsorption tower of the second stage are activated carbon and molecular sieve, or molecular sieve. The adsorbents in the adsorption tower of the first stage are activated alumina and molecular sieve in sequence from the bottom up; the adsorbent in the adsorption tower of the second stage is molecular sieve. The adsorbents in the adsorption tower of the first stage are activated alumina and molecular sieve in sequence from the bottom up; the adsorbent in the adsorption tower of the second stage is molecular sieve. The present invention may increase the recovery of the effective gas up to 99.9%, decrease the Electricity consumption by 50-90% (increase with increase of the adsorption pressure). It is observed that the present invention makes an innovation of the gas separation methods in art (including wet way gas separation technology and pressure swing adsorption gas separation technology), solves the problem of the effective gas loss and the high Electricity consumption drastically.

BRIEF DESCRIPTION OF THE DRAWINGS

FIG. 1 is the working procedure scheme of technology steps for the first stage pressure-swing adsorption device of example 1.

FIG. 2 is the working procedure scheme of technology steps for the second stage pressure-swing adsorption device of example 1.

DETAILED DESCRIPTION OF THE INVENTION

Figure 3:
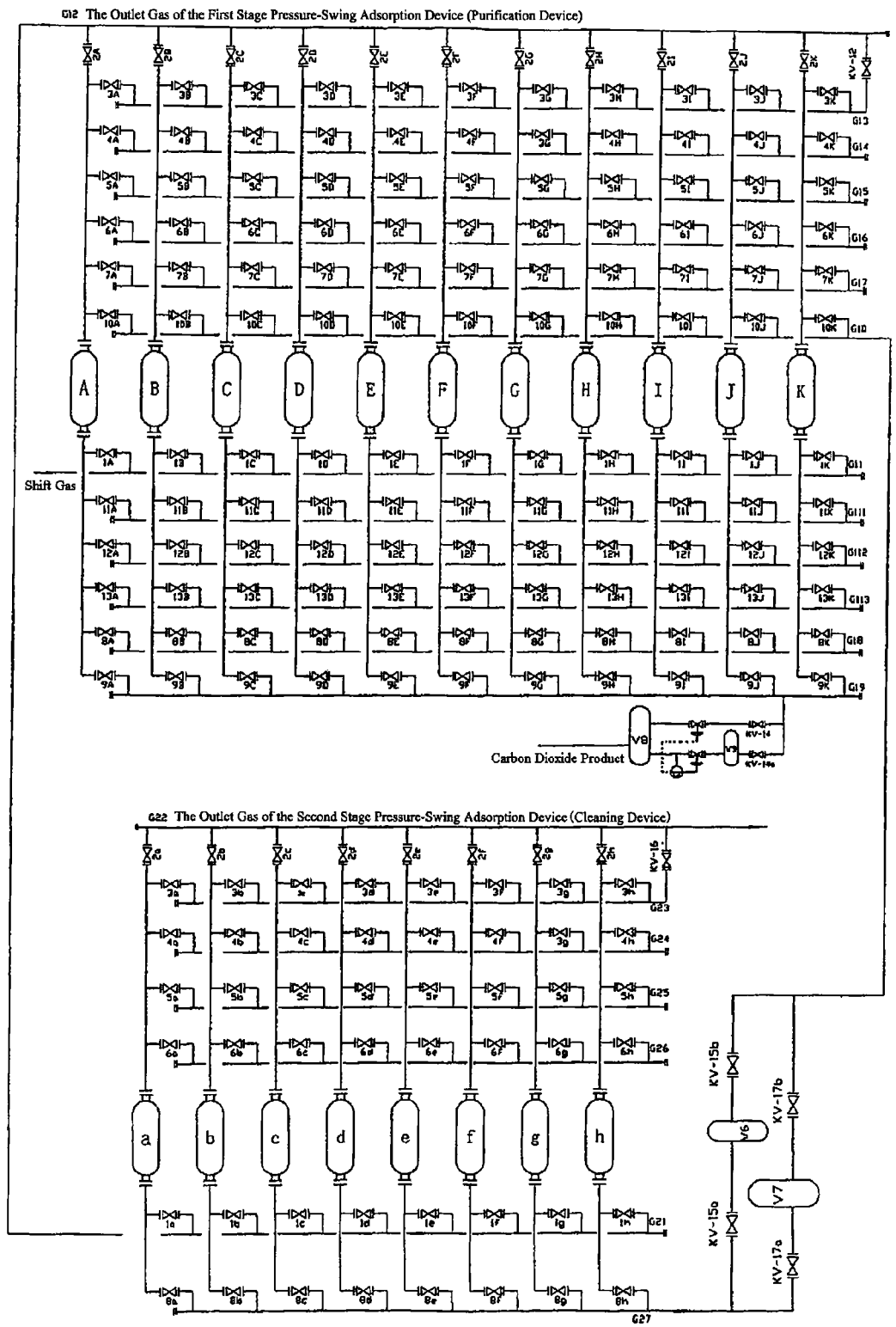
FIG. 3 is the technology flow sheet of example 1.

The gas mixture in the present invention may be synthetic ammonia shift gas, synthetic ammonia deflating gas, synthesis gas, water gas, natural gas, semi water gas, high temperature furnace gas, gas, cracking dry gas, oilfield associated gas and oil making gas and so on, also may be any other gas mixture.

The present invention adopts two-stage complete recycle pressure swing adsorption process for gas separation. The process is used to separate the strongly adsorbed component and the weakly adsorbed component from the gas mixture; the product can be the strongly adsorbed component or the weakly adsorbed component or both of them at the same time; the process adopts two-stage pressure-swing adsorption device operating in series; the gas mixture is fed into the first stage pressure-swing adsorption device, and the strongly adsorbed component of the gas mixture is adsorbed and is concentrated as product; the interim gas mixture from the outlet of the adsorption tower of the first stage pressure-swing adsorption device is fed into the second stage pressure-swing adsorption device; the strongly adsorbed component in the interim gas mixture is adsorbed further, and the nonadsorbed weakly adsorbed component acts as product and is fed into next step; all of the gas excepting for the weakly adsorbed component entering into next step in the second stage is returned into the first stage to increase the pressure of the adsorption tower; the average concentration of the strongly adsorbed components in outlet gas of the adsorption tower of the first stage is over or equal to 2 v % generally. The adsorption towers of the second stage are used to adsorb the strongly adsorbed components in outlet gas of the adsorption tower of the first stage to the desired level of the next step. Each adsorption tower of the two-stage pressure swing adsorption device goes through the steps in turn in one cycle as follows:

The First Stage:

(1) Adsorption A

Part of strongly adsorbed component is adsorbed by the adsorbent in the adsorption tower after the gas mixture is introduced to the inlet of the adsorption tower which is in the adsorption step; nonadsorbed weakly adsorbed component and part of strongly adsorbed component discharged from the outlet go into the adsorption tower of the second stage which is in the adsorption step. The total amount of adsorbed strongly adsorbed components will increase continuously with the increase of time the feed of gas is stopped when the adsorbed component mentioned above reach to the saturation on adsorbent, it means that the adsorption step is finished.

(2) Cocurrent Equalization Depressurization ED

The weakly adsorbed component concentration of the dead-space gas inside adsorption tower is rather high after finishing the adsorption step, this stream of the weakly adsorbed component need to be recovered and reused. The dead-space gas discharged at different times from the outlet of the adsorption tower enters into the adsorption tower which has completed the evacuation step VC to increase the pressure. The gas is discharged every time and pressure equalization is performed once. The strongly adsorbed component concentration at outlet of the adsorption tower increases continuously with the increase of the pressure equalization times. The pressure equalization times is determined by the adsorption pressure and the strongly adsorbed component concentration at the outlet of the adsorption tower after the adsorption step. In general, the strongly adsorbed component concentration at the top of the adsorption tower ought to be over 30 v %, better over 75 v % after the last cocurrent equalization depressurization step ED.

(3) Two-End Equalization Depressurization 2ED

The weakly adsorbed component concentration of the dead-space gas inside adsorption tower is rather high and the strongly adsorbed component concentration is relative lower after finishing the adsorption step; on the one hand this part weakly adsorbed component need to be recovered and reused, on the other hand the strongly adsorbed component concentration need to be increased, therefore, the gas inside the absorption tower must be discharged to perform the depressurization desorption. The dead-space gas discharged at different times from the outlet of the adsorption tower enters into the adsorption tower which has completed the first stage regeneration step to pressurize. The gas is discharged every time and the pressure equalization is performed once. The strongly adsorbed component concentration at the inlet and the outlet of the adsorption tower increases continuously with the increase of the equalization repressurization times, at the same time, the weakly adsorbed component is recovered and reused. Every time the equalization depressurization operation mentioned above is performed, it may be operated at the two ends of the adsorption tower at the same time, or it may begin with the cocurrent equalization depressurization from the top of the adsorption tower at first, and then do with the backward equalization depressurization to another adsorption tower at the latter time prior to achieving the cocurrent equalization depressurization balance, the goal is to increase the concentration of the strongly adsorbed component and to recover the weakly adsorbed component inside the adsorption tower; the third way is to perform the cocurrent equalization depressurization at first, and then to stop it before the balance of the pressure between two adsorption tower, and then to perform the backward equalization depressurization. The first way can increase the adsorbent's efficiency. The amount of gas discharged from the bottom of the adsorption tower ought to be less than the amount discharged from the top of the adsorption tower while performing the two-end equalization depressurization. The two-end equalization depressurization step 2ED' in the present invention is different from the usual equalization depressurization step ED the gas is discharged from the outlet of the adsorption tower at the usual equalization depressurization step ED, as to the said the cocurrent equalization depressurization, however, the gas is discharged from both the inlet and the outlet of the adsorption tower in the two-end pressure equalization depressurization 2ED' step in the present invention.

After the adsorption step A of the adsorption tower, the first several pressure equalization operation may use cocurrent equalization depressurization ED, but latter several times pressure equalization or the last pressure equalization adopts the two-end equalization depressurization 2ED'. The concentration of the strongly adsorbed component in product still meet the production requirement after the equalization depressurization.

The pressure equalization times is determined by the adsorption pressure and the concentration of the strongly adsorbed component at the outlet of the adsorption tower after the adsorption step. In ordinary circumstances, after the last two-end equalization depressurization step 2ED'. The concentration of the strongly adsorbed component at top of the adsorption tower ought to be over 30 v %, better over 75 v %. The concentration of the strongly adsorbed component at bottom of the adsorption tower ought to be over 30 v %, better over 80 v %.

(4) Backward Depressurization BD

After the two-end equalization depressurization step 2ED', the strongly adsorbed component inside the adsorption tower is introduced into the next stage till to balance with the pressure of the next stage; the strongly adsorbed component can be as product or as fuel or venting.

(5) First Backward Depressurization Step BD1

After the cocurrent equalization depressurization step ED, the weakly adsorbed component at the bottom inside the adsorption tower is discharged into the buffer vessel at first, and then the gas is introduced inside the buffer vessel into the adsorption tower to pressurize; in ordinary circumstances, after the first backward depressurization step BD1, the concentration of the strongly adsorbed component at bottom of the adsorption tower ought to be over 30 v %, better over 80 v %.

(6) Second Backward Depressurization Step BD2

After the second backward depressurization step BD1, the strongly adsorbed component inside the adsorption tower is introduced into the next stage till to balance with the pressure of the next stage; the strongly adsorbed component can be as product or as fuel or venting.

(7) Evacuation VC

After the backward depressurization step BD, the strongly adsorbed component adsorbed on adsorbent pulled by vacuum pump from the bottom of the adsorption tower is introduced into the next stage. After the backward depressurization step BD, the purge step P is performed if the evacuation step VC is not performed; the dried strongly adsorbed component or another dry gas inside the system can be as purge gas. This step is adopted when the adsorbent amount need to be decreased.

(8) First Stage Gas Repressurization 2ER'

After the backward depressurization step BD or evacuation step VC, the gas discharged from the adsorption tower of the first stage in the first backward depressurization step BD1 is returned to the outlet of the adsorption tower of the first stage to pressurize the adsorption tower which has finished the backward depressurization step BD or the evacuation step VC. The added step can increase the recovery of the effective gas.

(9) Second Stage Gas Repressurization 2ER

After the backward depressurization step BD or evacuation step VC or the first stage gas repressurization step 2ER1, in second stage, other gas excepting the weakly adsorbed component entering into the next stage is returned into the outlet of the adsorption tower of the first stage to pressurize the adsorption tower which has finished the backward depressurization step BD or the evacuation step VC. The added step can increase the recovery of the effective gas.

(10) Two-End Equalization Repressurization 2ER'

After the second stage gas repressurization step 2ER, the gas discharged from the two-end equalization depressurization step 2ED' in first stage is introduced into the adsorption tower from the inlet and the outlet to pressurize the adsorption tower gradually. The times of the two-end equalization repressurization step 2ER' and the times of the two-end equalization depressurization step 2ED' are the same. Every time the gas used for the two-end equalization repressurization step 2ER' comes from the gas of the two-end depressurization step 2ED' of the different adsorption tower. The two-end equalization repressurization step 2ER' in first stage is different from the usual equalization repressurization step ER, the gas discharged from the usual equalization repressurization step ER is introduced at the outlet, however, the gas discharged from the two-end equalization repressurization step 2ER' in first stage is entered at both the inlet and the outlet.

After the adsorption step A, while performing the cocurrent equalization depressurization step ED for the first several times, the gas discharged from the equalization repressurization step ER of the adsorption tower enter into the adsorption tower at its outlet, not at its inlet.

(11) Backward Equalization Repressurization ER

After the second stage gas repressurization step 2ER or the two-end equalization pressurization step 2ER', the gas discharged from the cocurrent equalization depressurization step is introduced into the adsorption tower at outlet to pressurize the adsorption tower which has finished the backward depressurization step BD or the evacuation step VC or purge step P gradually, the times of the equalization repressurization step and the equalization depressurization step are the same. Every time the gas used for the equalization repressurization step comes from the gas of the equalization depressurization step of the different adsorption tower.

(12) Final Repressurization FR

After the two-end equalization repressurization step 2ER', the gas discharged from the outlet of the adsorption tower at the adsorption step is utilized to pressure the adsorption tower from the top till the adsorb pressure is reached.

The Second Stage:

(1) Adsorption A

The outlet gas discharged from the adsorption tower of the first stage which is in the adsorption step is introduced to the adsorption tower of the second stage device which is in the adsorption step. The strongly adsorbed component is adsorbed selectively by the adsorbent in the adsorption towers and is discharged from the outlet into the next stage. The strongly adsorbed component that adsorbed will increase continuously with the increase of time. The gas feed is stopped when the adsorbed component mentioned above reaches to the saturation on adsorbent, it means that the adsorption step finishes. The concentration of the strongly adsorbed component of the outlet gas is controlled according to the production requirement, it can be decreased lower to several ppm.

(2) Cocurrent Equalization Repressurization ED

After the adsorption step, the weakly adsorbed component concentration in the dead-space gas is rather high and this stream gas need to be recovered and reused. The dead-space gas discharged at different times from the outlet of the adsorption tower enters into the adsorption tower which has completed the evacuation step VC to increase the pressure. The gas is discharged every time and the pressure equalization is performed once. The concentration of the strongly adsorbed component at outlet of the adsorption tower increase continuously with the increase of the pressure equalization times. The pressure equalization times is determined by the adsorption pressure and the strongly adsorbed component concentration at the outlet of the adsorption tower after the adsorption step.

(3) Cocurrent Depressurization PP

After the cocurrent equalization depressurization step ED, the gas inside the adsorption tower is discharged cocurrent directly into the another adsorption tower to purge the strongly adsorbed component adsorbed on the adsorbent, another way, the gas is discharged into the buffer vessel at first, and then is discharged from the vessel into the another adsorption tower to purge the strongly adsorbed component adsorbed on the adsorbent to achieve the adsorbent regeneration. Cocurrent depressurization step PP can be performed once, and also two times, third times, even if many times. The more times of the cocurrent depressurization step PP are adopted, the better purge effect is obtained and the less adsorbent dosage is used, but the higher investment in non-standard equipment, special sequence valve, oil pressure system, control system and apparatus, moreover the dosage decreasing of the adsorbent is limited less and less along with the times of the cocurrent depressurization step PP increasing, the investment in non-standard equipment, special program control valve, oil pressure system, control system and apparatus will be more and more, so times of the cocurrent depressurization PP are not suitable for repeating many times.

(4) Backward Depressurization BD

After the cocurrent equalization depressurization step ED or cocurrent depressurization step PP, the gas is discharged at backward direction into the adsorption tower of the first stage.

(5) Evacuation VC or Purge P

After the backward depressurization step BD, the strongly adsorbed component and other component adsorbed on adsorbent pulled by vacuum pump from the bottom of the adsorption tower is introduced into the first stage device to achieve the adsorbent regeneration; another way, the gas mixture discharged from the cocurrent depressurization step PP is used to purge the strongly adsorbed component adsorbed on the adsorbent to achieve the adsorbent regeneration. The gas mixture after the adsorbent purge step is discharged into the adsorption tower of the first stage device.

(6) Backward Equalization Repressurization ER

After the backward depressurization step BD or the evacuation step VC or the purge step P, the gas discharged from the cocurrent equalization depressurization step is introduced into the adsorption tower at outlet to pressurize the adsorption tower which has completed the backward depressurization step BD or the evacuation step VC or purge step P gradually, the times of the equalization repressurization step and the equalization depressurization are the same. Every time the gas used for the equalization repressurization step comes from the gas after the equalization depressurization step of the different adsorption tower.

(7) Final Repressurization FR

After the equalization repressurization step, the gas discharged from the outlet of the adsorption tower at adsorption step is utilized to pressurize the adsorption tower from the top till the adsorb pressure is reached.

EXAMPLE 1

The feed gas in the present example is the synthetic ammonia shift gas, including those from coal, natural gas, oil and so on.

The components of synthetic ammonia shift gas are shown in the following table:

| | Component | | | | | | | |
|---|---|---|---|---|---|---|---|---|
| | H2 | N2 | CO2 | CO | CH4 | O2 + Ar | Total sulfur | Water (steam) |
| Conc.(%) V | 46 53 | 12 17 | 18 30 | ≤1 9 | 1 2 | ≤0.8 | 150 mg/Nm3 | saturation |

Temperature ≤40
Pressure 3.0 MPa G

As shown in FIG. 3, the first stage device comprises of eleven adsorption towers (A-K). The adsorbents in the adsorption tower from the bottom up in sequence are activated alumina and fine-porous-silicagel. Single tower is simultaneously in an adsorption step and the pressure equalization step performs nine times in the working procedure. The second stage device comprises of eight adsorption towers (a-h). The adsorbent in the adsorption tower is fine-porous-silicagel. Single tower is simultaneously in an adsorption step and the pressure equalization step performs six times in the working procedure. In the first stage, carbon dioxide is purified to over 98 v % for synthesizing carbamide. In the second stage, the outlet gas of the first stage is further purified to meet the requirement of the next procedure in synthetic ammonia production; carbon dioxide concentration in hydrogen, nitrogen at the top outlet of the adsorption tower of the second stage is controlled less than 0.2 v %.

Figures 1, 2:
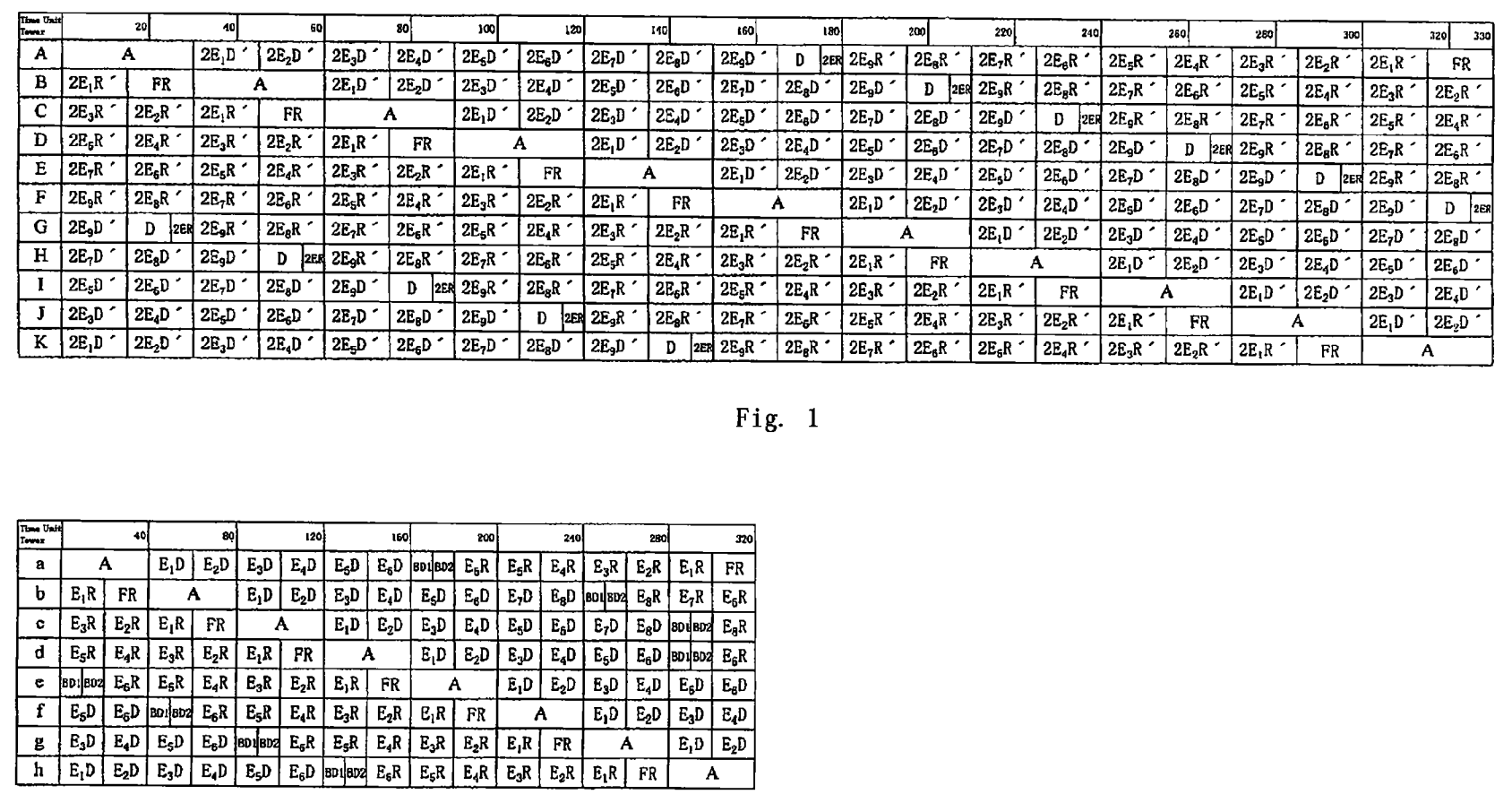

The shift gas enters into the first stage in adsorption step. The adsorbents adsorb selectively water, organic sulfur, inorganic sulfur and carbon dioxide and so on in turn from the shift gas. The nonadsorbed partial carbon dioxide and the weakly adsorbed components such as carbon monoxide, methane, nitrogen, hydrogen and other components are discharged from the outlet and enter into the absorption tower of the second stage in adsorption step. The adsorbents adsorb selectively carbon dioxide, the weakly adsorbed components such as carbon monoxide, methane, nitrogen, hydrogen and other components are discharged from the outlet and enter into the compressing procedure. In the first stage, the adsorption tower sequentially undergoes pressure swing adsorption step in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', carbon dioxide product backward depressurization BD, second stage gas repressurization 2ER, ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization 2E2R first two-end equalization repressurization 2E1R, final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, backward depressurization BD1, backward depressurization BD2, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane. The gas discharged from the second stage in backward depressurization BD step is returned into the adsorption tower of the first stage which has completed carbon dioxide product backward depressurization BD step totally to pressurize, abbr. 2ER. Taking the adsorption tower A as an example and crossing reference to FIG. 1 and FIG. 2, we demonstrate the steps of the adsorption tower of the first stage in one circulation period in this example:

(1) Adsorption A

By now, adsorption tower A has completed FR step, open the sequence valve 1A, 2A. The shift gas goes through pipeline G11 and enters into the adsorption tower A. In adsorption tower A, the adsorbents adsorb selectively water, organic sulfur, inorganic sulfur and carbon dioxide in turn from the shift gas. The nonadsorbed partial carbon dioxide and the weakly adsorbed component such as carbon monoxide, methane, nitrogen, hydrogen and other components flow from the outlet through the sequence valve 2A and enter into the adsorption tower in adsorption step of the second stage. The total amount of adsorbed water, organic sulfur, inorganic sulfur and carbon dioxide increases gradually with the increase of time. Stop feeding gas when the adsorbents are saturated by the components mentioned above, and the adsorption ends. Close 1A, 2A. The concentration of carbon dioxide in the outlet gas should be controlled at 6 to 15% (V).

(2) The First Two-End Equalization Depressurization, abbr. 2E1D'

After the adsorption step, open the sequence valve 3A, 3C, 11A and 11C. The gas inside the adsorption tower A goes through pipeline G13 and G111 and enters into the adsorption tower C to perform the first two-end equalization repressurization (abbr. 2E1R'). When the pressure in the adsorption tower A balances with the pressure in the adsorption tower C, close 3A,11C.

(3) The Second Two-End Equalization Depressurization, abbr. 2E2D'

After 2E1D' step, open the sequence valve 4A,4D,11D. The gas inside the adsorption tower A goes through pipeline G14 and G111 and enters into the adsorption tower D to perform the second two-end equalization repressurization (abbr. 2E2R'). When the pressure in adsorption tower A balances with the pressure in adsorption tower D, close 4D,11A and 11D.

(4) The Third Two-End Equalization Depressurization, abbr. 2E3D'

After 2E2D' step, open the sequence valve 4E,12A,12E. The gas inside the adsorption tower A goes through pipeline G14 and G112 and enters into the adsorption tower E to perform the third two-end equalization repressurization (abbr. 2E3R'). When the pressure in the adsorption tower A balances with the pressure in the adsorption tower E, close 4A,4E, and 12E.

(5) The Fourth Two-End Equalization Depressurization, abbr. 2E4D'

After 2E3D' step, open the sequence valve 5A,5F,12F. The gas inside the adsorption tower A goes through pipeline G15 and G112 and enters into the adsorption tower F to perform the fourth two-end equalization repressurization (abbr. 2E4R'). When the pressure in the adsorption tower A balances with the pressure in the adsorption tower F, close 5F,12A and 12F.

(6) The Fifth Two-end Equalization Depressurization, abbr. 2E5D'

After 2E4D' step, open the sequence valve 5G,13A,13G. The gas inside the adsorption tower A goes through pipeline G15 and G113 and enters into the adsorption tower G to perform the fifth two-end equalization repressurization (abbr. 2E5R'). When the pressure in the adsorption tower A balances with the pressure in the adsorption tower G, close 5A,5G and 13G.

(7) The Sixth Two-End Equalization Depressurization, abbr. 2E6D'

After 2E5D' step, open the sequence valve 6A,6H,13H. The gas inside the adsorption tower A goes through pipeline G16 and G113 and enters into the adsorption tower H to perform the sixth two-end equalization repressurization (abbr. 2E6R'). When the pressure in the adsorption tower A balances with the pressure in the adsorption tower H, close 6H,13A and 13H.

(8) The Seventh Two-End Equalization Depressurization, abbr. 2E7D'

After 2E6D' step, open the sequence valve 6I,8A,8I. The gas inside the adsorption tower A goes through pipeline G16 and G18 and enters into the adsorption tower I to perform the seventh two-end equalization repressurization (abbr. 2E7R'). When the pressure in the adsorption tower A balances with the pressure in the adsorption tower I, close 6A,6I and 8I.

(9) The Eighth Two-End Equalization Depressurization, abbr. 2E7D'

After 2E7D' step, open the sequence valve 7A,7J,8J. The gas inside the adsorption tower A goes through pipeline G17 and G18 and enters into the adsorption tower J to perform the eighth two-end equalization repressurization (abbr. 2E8R').

When the pressure in the adsorption tower A balances with the pressure in the adsorption tower J, close 7J,8A and 8J.

(10) The Ninth Two-End Equalization Depressurization, abbr. 2E9D'

After 2E8D' step, open the sequence valve 7K,9A,9K. The gas inside the adsorption tower A goes through pipeline G17 and G19 and enters into the adsorption tower K to perform the ninth two-end equalization repressurization (abbr. 2E9R'). When the pressure in the adsorption tower A balances with the pressure in the adsorption tower K, close 7A,7K and 9K.

After 2E9D' step, the concentration of the strongly adsorbed components at the top is over 70% (V); the concentration of the strongly adsorbed components at the bottom is over 75% (V).

(11) Carbon Dioxide Product Backward Depressurization BD

After 2E9D' step, first open the sequence valve KV-14a. The carbon dioxide product in the adsorption tower A is introduced into the interim buffer vessel V9 of carbon dioxide product. When the pressure in the adsorption tower A reaches the pressure in vessel V9 closely, close KV-14a, and then open the sequence valve KV14, introduce the carbon dioxide product in the adsorption tower A into the interim buffer vessel V8 of carbon dioxide. When the pressure in the adsorption tower A reaches the pressure in vessel V8 closely, close KV-14.

(12) Second Stage Gas Repressurization 2ER

After BD step, open the sequence valve 10A. The gas in V6 and V7 enters into the adsorption tower A to pressurize it, when the pressure in V6 and V7 balances with the pressure in the adsorption tower A, close 10A.

(13) The Ninth Two-End Equalization Repressurization, abbr. 2E9R'

After 2ER step, open the sequence valve 7A,7B,9A and 9B. The gas inside the adsorption tower B goes through pipeline G19 and G17 and enters into the adsorption tower A to perform the ninth two-end equalization repressurization (abbr. 2E9R'). When the pressure in the adsorption tower A balances with the pressure in the adsorption tower B, close 7B,9A and 9B.

(14) The Eighth Two-End Equalization Repressurization, abbr. 2E8R'

After 2E9R' step, open the sequence valve 7A,7C,8A and 8C. The gas inside the adsorption tower C goes through pipeline G17 and G18 and enters into the adsorption tower A to perform the eighth two-end equalization repressurization (abbr. 2E8R'). When the pressure in the adsorption tower A balances with the pressure in the adsorption tower C, close 7A,7C and 8C.

(15) The Seventh Two-End Equalization Repressurization, abbr. 2E7R'

After 2E8R' step, open the sequence valve 6A,6D,8D. The gas inside the adsorption tower D goes through pipeline G16 and G18 and enters into the adsorption tower A to perform the eighth two-end equalization repressurization (abbr. 2E7R'). When the pressure in the adsorption tower A balances with the pressure in the adsorption tower D, close 6D,8A and 8D.

(16) The Sixth Two-End Equalization Repressurization, abbr. 2E6R'

After 2E7R' step, open the sequence valve 6E,13A,13E. The gas inside the adsorption tower E goes through pipeline G16 and G113 and enters into the adsorption tower A to perform the sixth two-end equalization repressurization (abbr. 2E6R'). When the pressure in the adsorption tower A balances with the pressure in the adsorption tower E, close 6A,6E and 13E.

(17) The Fifth Two-End Equalization Repressurization, abbr. 2E5R'

After 2E6R' step, open the sequence valve 5A,5F,13F. The gas inside the adsorption tower F goes through pipeline G15 and G113 and enters into the adsorption tower A to perform the fifth two-end equalization repressurization (abbr. 2E5R'). When the pressure in the adsorption tower A balances with the pressure in the adsorption tower F, close 5F,13A and 13F.

(18) The Fourth Two-End Equalization Repressurization, abbr. 2E4R'

After 2E5R' step, open the sequence valve 5G,12A,12G. The gas inside the adsorption tower G goes through pipeline G15 and G112 and enters into the adsorption tower A to perform the fourth two-end equalization repressurization (abbr. 2E4R'). When the pressure in the adsorption tower A balances with the pressure in the adsorption tower F, close 5A,5G and 12G.

(19) The Third Two-End Equalization Repressurization, abbr. 2E3R'

After 2E4R' step, open the sequence valve 4A,4H,12H. The gas inside the adsorption tower H goes through pipeline G14 and G112 and enters into the adsorption tower A to perform the fourth two-end equalization repressurization (abbr. 2E3R'). When the pressure in the adsorption tower A balances with the pressure in the adsorption tower H, close 4H,12A,12H.

(20) The Second Two-end Equalization Repressurization, abbr. 2E2R'

After 2E3R' step, open the sequence valve 4I,11A,11I. The gas inside the adsorption tower I goes through pipeline G14 and G111 and enters into the adsorption tower A to perform the fourth two-end equalization repressurization (abbr. 2E2R'). When the pressure in the adsorption tower A balances with the pressure in the adsorption tower I, close 4A,4I,11I.

(21) The First Two-End Equalization Repressurization, abbr. 2E1R'

After 2E2R' step, open the sequence valve 3A,3J,11J. The gas inside the adsorption tower J goes through pipeline G13 and G111 and enters into the adsorption tower A to perform the first two-end equalization repressurization (abbr. 2E1R'). When the pressure in the adsorption tower A balances with the pressure in the adsorption tower J, close 3J,11A,11J.

(22) Final Repressurization FR

After 2E1R' step, open the sequence valve KV-12. The outlet gas discharged from the adsorption tower in adsorption step is used to increase the pressure at the top of the adsorption tower A, when the pressure in A balances with the adsorption pressure, close KV-12 and 3A.

By far, the adsorption tower A has completed a circulation period and can enter into the next circulation. The steps of B to D adsorption towers are the same, but the operating time are staggered, see FIG. 1 and FIG. 3.

Now taking the adsorption tower a as an example and crossing reference to FIG. 2 and FIG. 3, we demonstrate the steps of the adsorption tower of the second stage in one circulation period in this example:

(1) Adsorption A

By now, the adsorption tower a has completed FR step, open the sequence valve 1a, 2a. The interim gas mixture goes through pipeline G21 and enters into the adsorption tower a. In the adsorption tower a, the adsorbents adsorb selectively carbon dioxide and other components in outlet gas of the first stage. The little nonadsorbed carbon dioxide and the weakly adsorbed component such as carbon monoxide, methane, nitrogen, hydrogen and other components flow out the outlet through the sequence valve 2a and enter into the synthetic ammonia compressing procedure. The total amount of adsorbed carbon dioxide increases gradually with the increase of time. Stop feeding gas when the adsorbents are saturated by carbon dioxide, and the adsorption ends. Close 1a, 2a. The carbon dioxide concentration in the outlet gas should be controlled at lower 2% (V).

(2) The First Cocurrent Equalization Depressurization, abbr. E1D

After the adsorption step, open the sequence valve 3a,3c. The gas inside the adsorption tower a goes through pipeline G23 and enters into the adsorption tower C to perform E1R step. When the pressure in the adsorption tower a balances with the pressure in the adsorption tower c, close 3a.

(3) The Second Cocurrent Equalization Depressurization, abbr. E2D

After E1D step, open the sequence valve 4a,4d. The gas inside the adsorption tower a goes through pipeline G24 and enters into the adsorption tower d to perform E2R step. When the pressure in the adsorption tower a balances with the pressure in the adsorption tower d, close 4d.

(4) The Third Cocurrent Equalization Depressurization, abbr. E3D

After E2D step, open the sequence valve 4e. The gas inside the adsorption tower a goes through pipeline G24 and enters into the adsorption tower e to perform E3R step. When the pressure in the adsorption tower a balances with the pressure in the adsorption tower e, close 4a,4e.

(5) The Fourth Cocurrent Equalization Depressurization, abbr. E4D

After E3D step, open the sequence valve 5a,5f. The gas inside the adsorption tower a goes through pipeline G25 and enters into the adsorption tower f to perform E4R step. When the pressure in the adsorption tower a balances with the pressure in the adsorption tower f, close 5f.

(6) The Fifth Cocurrent Equalization Depressurization, abbr. E5D

After E4D step, open the sequence valve 5g. The gas inside the adsorption tower a goes through pipeline G25 and enters into the adsorption tower g to perform E5R step. When the pressure in the adsorption tower a balances with the pressure in the adsorption tower g, close 5f,5a.

(7) The Sixth Cocurrent Equalization Depressurization, abbr. E6D

After E5D step, open the sequence valve 6a,6h. The gas inside the adsorption tower a goes through pipeline G26 and enters into the adsorption tower h to perform E6R step. When the pressure in the adsorption tower a balances with the pressure in the adsorption tower h, close 6h.

(8) Backward Depressurization BD

After E6D step, open the sequence valve 8a,KV-15a. The gas inside adsorption tower a is backward (BD1) discharged into the buffer vessel V6 at first, close KV-15a after the pressure balance, then to open the sequence valve KV-17a. The gas is backward (BD2) discharged into the buffer vessel V7, close 8a,KV-17a after pressure balance. The backward depressurization BD step ends.

(9) The Sixth Backward Equalization Repressurization, abbr. E6R

After BD step, open the sequence valve 6a,6b. The gas inside the adsorption tower b goes through pipeline G26 and enters into the adsorption tower a to perform E6R step. When the pressure in the adsorption tower b balances with the pressure in the adsorption tower a, close 6a,6b.

(10) The Fifth Backward Equalization Repressurization, abbr. E5R

After E6R step, open the sequence valve 5a,5c. The gas inside the adsorption tower c goes through pipeline G25 and enters into the adsorption tower a to perform E5R step. When the pressure in the adsorption tower c balances with the pressure in the adsorption tower a, close 5c.

(11) The Fourth Backward Equalization Repressurization, abbr. E4R

After E5R step, open the sequence valve 5d. The gas inside the adsorption tower d goes through pipeline G25 and enters into the adsorption tower a to perform E4R step. When the pressure in the adsorption tower d balances with the pressure in the adsorption tower a, close 5a,5d.

(12) The Third Backward Equalization Repressurization, abbr. E3R

After E4R step, open the sequence valve 4a,4e. The gas inside the adsorption tower e goes through pipeline G24 and enters into the adsorption tower a to perform E3R step. When the pressure in the adsorption tower e balances with the pressure in the adsorption tower a, close 4e.

(13) The Second Backward Equalization Repressurization, abbr. E2R

After E3R step, open the sequence valve 4f. The gas inside the adsorption tower f goes through pipeline G24 and enters into the adsorption tower a to perform E2R step. When the pressure in the adsorption tower f balances with the pressure in the adsorption tower a, close 4f,4a.

(14) The First Backward Equalization Repressurization, abbr. E1R

After E2R step, open the sequence valve 3a,3g. The gas inside the adsorption tower g goes through pipeline G23 and enters into the adsorption tower a to perform E1R step. When the pressure in the adsorption tower g balances with the pressure in the adsorption tower a, close 3g.

(15) Final Repressurization FR

After E1R step, open the sequence valve KV-16. The outlet gas discharged from the adsorption tower in adsorption step is used to increase pressure at the top of the adsorption tower a. When the pressure in the adsorption tower a reaches the adsorption pressure, close KV-16 and 3a.

By far, the adsorption tower a has completed a circulation and can enter into the next circulation. The steps of b to h adsorption towers are the same, but the operating time are staggered, see FIG. 2 and FIG. 3.

The result of this example is that the purity of carbon dioxide product is 98.5 v %. The recovery of carbon dioxide, hydrogen, nitrogen and carbon monoxide is above 99.9 v %. The concentration of carbon dioxide in hydrogen and nitrogen product is lower 0.2 v %. Electricity consumption 2 kwh per ton ammonia used for instrument and light For this example, using the given adsorbents combination of the present invention and performing the steps at the same other condition (e.g. adsorption pressure at 3.0 MPa(g), shift gas composition and temperature, adsorption cycle time, power equipment performance, apparatus and instrument and its control function, construction and life of special sequence valve and liquid pressure system), the preliminary equipment invest used for removing carbon can save 8%.

EXAMPLE 2

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 1.8 MPa(g), the transporting pressure of carbon dioxide product is 0.005 MPa.

The first stage device comprises of twelve adsorption towers. Single tower is simultaneously in an adsorption step and the pressure equalization step performs ten times in the working procedure. The second stage device comprises of eight adsorption towers. Single tower is simultaneously in an adsorption step and the pressure equalization step performs six times in the working procedure. In the first stage, carbon dioxide is purified to over 98 v % for synthesizing carbamide. In the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.8 v %.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', carbon dioxide product backward depressurization BD, second stage gas repressurization 2ER, tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization 2E2R first two-end equalization repressurization 2E1R, final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, backward depressurization BD, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step is returned into the adsorption tower of the first stage which has completed carbon dioxide product backward depressurization BD step totally to pressurize, abbr.2ER.

The result of this example is that the purity of carbon dioxide product is 98 v %, the recovery of carbon dioxide, hydrogen, nitrogen and carbon monoxide is above 99.8 v %. The concentration of carbon dioxide in hydrogen and nitrogen product is lower 0.8 v %, Electricity consumption 2 kwh per ton ammonia used for instrument and light.

For this example, using the given adsorbents combination of the present invention and performing the steps at the same other conditions (e.g. adsorption pressure at 1.8 MPa(g), shift gas composition and temperature, adsorption cycle time, power equipment performance, apparatus and instrument and its control function, construction and life of special sequence valve and liquid pressure system), the preliminary equipment invest used for removing carbon can save 9%.

EXAMPLE 3

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 3.0 MPa(g), the transporting pressure of carbon dioxide product is 0.005 MPa.

The first stage device comprises of twelve adsorption towers. Single tower is simultaneously in an adsorption step and the pressure equalization step performs ten times in the working procedure. The second stage device comprises of eight adsorption towers. Single tower is simultaneously in an adsorption step and the pressure equalization step performs six times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', two-end tenth equalization depressurization 2E10D', carbon dioxide product backward depressurization BD, second stage gas repressurization 2ER, tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, backward depressurization BD, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step is returned into the adsorption tower of the first stage which has completed carbon dioxide product backward depressurization BD step totally to pressurize, abbr.2ER.

The result of this example is that the purity of carbon dioxide product is 98 v %, the recovery of carbon dioxide, hydrogen, nitrogen and carbon monoxide is above 99.9 v %. The concentration of carbon dioxide in hydrogen and nitrogen product is lower 0.2 v %. Electricity consumption 2 kwh per ton ammonia used for instrument and light.

For this example, using the given adsorbents combination of the present invention and performing the steps at the same other conditions (e.g. adsorption pressure at 3.0 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 4

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 1.8 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of six adsorption towers. Single tower is simultaneously in an adsorption step and the pressure equalization step performs four times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.8 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', carbon dioxide product backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R', seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E11D, second equalization depressurization E2D, third equalization depressurization E3D, fourth equalization depressurization E4D, backward depressurization BD, fourth equalization repressurization E4R, third equalization repressurization E3R, second equalization repressurization E2R, first equalization repressurization E11R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step is returned into the adsorption tower of the first stage which has completed carbon dioxide product backward depressurization BD step totally to pressurize, abbr.2ER.

The result of this example is that the purity of carbon dioxide product is 98 v %. The recovery of carbon dioxide, hydrogen, nitrogen and carbon monoxide is above 99.5 v %. The concentration of carbon dioxide in hydrogen and nitrogen product is lower 0.8 v %. Electricity consumption 2 kwh per ton ammonia used for instrument and light.

For this example, using the given adsorbents combination of the present invention and performing the steps at the same other conditions (e.g. adsorption pressure at 1.80 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 5

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.6 MPa(g), the transporting pressure of carbon dioxide product is 0.005 MPa.

The first stage device comprises of twelve adsorption towers. Single tower is simultaneously in an adsorption step and the pressure equalization step performs ten times in the working procedure. The second stage device comprises of six adsorption towers Single tower is simultaneously in an adsorption step and the pressure equalization step performs three times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', carbon dioxide product backward depressurization BD, evacuation VC, second stage gas repressurization 2ER, tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization 2E2R first two-end equalization repressurization 2E1R, final repressurization FR. The gas obtained from the first stage in carbon dioxide product depressurization BD step and evacuation VC step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, backward depressurization BD, evacuation VC, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step and evacuation VC step is returned into the adsorption tower of the first stage which has completed evacuation VC step totally to pressurize, abbr.2ER.

The result of this example is that the purity of carbon dioxide product is 98 v %. The recovery of carbon dioxide is above 99 v %. The recovery of hydrogen, nitrogen and carbon monoxide is above 99.9 v %. The concentration of carbon dioxide in hydrogen and nitrogen product is lower 0.2 v %. Electricity consumption 95 kwh per ton ammonia used for instrument and light.

For this example, using the given adsorbents combination of the present invention and performing the steps at the same other conditions (e.g. adsorption pressure at 0.6 MPa(g), shift gas composition and temperature, adsorption cycle time, power equipment performance, apparatus and instrument and its control function, construction and life of special sequence valve and liquid pressure system), the preliminary equipment invest used for removing carbon can save 12%.

EXAMPLE 6

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.6 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of six adsorption towers. Single tower is simultaneously in an adsorption step and the pressure equalization step performs three times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', carbon dioxide product backward depressurization BD, evacuation VC, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, equalization repressurization E4R, third equalization repressurization E3R, second equalization repressurization E2R first equalization repressurization E1R, final repressurization FR. The gas obtained from the first stage in carbon dioxide product depressurization BD step and evacuation VC step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, backward depressurization BD, evacuation VC, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step and evacuation VC step is returned into the adsorption tower of the first stage which has completed evacuation VC step totally to pressurize, abbr.2ER.

The result of this example is that the purity of carbon dioxide product is 98 v %. The recovery of carbon dioxide, hydrogen, nitrogen and carbon monoxide is above 99.9 v %. The concentration of carbon dioxide in hydrogen and nitrogen product is lower 0.2 v %. Electricity consumption 95 kwh per ton ammonia used for instrument and light.

For this example, using the given adsorbents combination of the present invention and performing the steps at the same other conditions (e.g. adsorption pressure at 0.6 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 7

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.8 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs four times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', carbon dioxide product backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, equalization repressurization E4R, third equalization repressurization E3R, second equalization repressurization E2R first equalization repressurization E1R, final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, backward depressurization BD, evacuation VC, fourth equalization repressurization E4R, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step and evacuation VC step is returned into the adsorption tower of the first stage which has completed carbon dioxide product backward depressurization BD step totally to pressurize, abbr.2ER.

The result of this example is that the purity of carbon dioxide product is 98 v %. The recovery of carbon dioxide, hydrogen, nitrogen and carbon monoxide is above 99.9 v %. The concentration of carbon dioxide in hydrogen and nitrogen product is lower 0.2 v %. Electricity consumption 65 kwh per ton ammonia used for instrument and light.

For this example, using the given adsorbents combination of the present invention and performing the steps at the same other conditions (e.g. adsorption pressure at 0.8 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 8

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.6 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of four adsorption towers. Single tower is simultaneously in an adsorption step and the pressure equalization step performs two times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', carbon dioxide product backward depressurization BD, evacuation VC, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R first equalization repressurization E1R, final repressurization FR. The gas obtained from the first stage in carbon dioxide product depressurization BD step and evacuation VC step is carbon dioxide product. In the second stage, the adsorption tower sequentially undergoes such pressure swing adsorption step in one circulation period as adsorption A, first equalization depressurization E1D, second equalization depressurization E2D, backward depressurization BD, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step is returned into the adsorption tower of the first stage which has completed evacuation VC step totally to pressurize, abbr.2ER.

The result of this example is that the purity of carbon dioxide product is 98 v %. The recovery of carbon dioxide, hydrogen, nitrogen and carbon monoxide is above 99.9 v %. The concentration of carbon dioxide in hydrogen and nitrogen product is lower 0.2 v %. Electricity consumption 52 kwh per ton ammonia.

For this example, using the given adsorbents combination of the present invention and performing the steps at the same other conditions (e.g. adsorption pressure at 0.6 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 9

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.8 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of five adsorption towers. Single tower is simultaneously in an adsorption step and the pressure equalization step performs two times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', eleventh two-end equalization depressurization 2E11D', carbon dioxide product backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization 2E2R' first two-end equalization repressurization 2E1R', final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E1D, second equalization depressurization E2D, cocurrent depressurization PP, backward depressurization BD, purge P, second equalization repressurization E2R, first equalization repressurization E1R, final repressurization FR. The gas mixture discharged from the adsorption tower in cocurrent depressurization PP step is used directly to purge the adsorption tower that has completed backward depressurization BD step by regulating its flow. The impurity adsorbed on the adsorbent is desorbed. The gas mixture discharged from the outlet of the adsorption tower of the second stage in adsorption step is mainly nitrogen and hydrogen product, wherein containing little carbon monoxide and methane in it. The gas discharged from the second stage in backward depressurization BD step and purge P step is returned into the adsorption tower of the first stage which has completed carbon dioxide product backward depressurization BD step totally to pressurize, abbr.2ER.

The result of this example is that the purity of carbon dioxide product is 98 v %. The recovery of carbon dioxide, hydrogen, nitrogen and carbon monoxide is above 99.9 v %. The concentration of carbon dioxide in hydrogen and nitrogen product is lower 0.8 v %. Electricity consumption is 3 kwh per ton ammonia.

For this example, using the given adsorbents combination of the present invention and performing the steps at the same other conditions (e.g. adsorption pressure at 0.8 MPa(g), shift gas composition and temperature, adsorption cycle time, power equipment performance, apparatus and instrument and its control function, construction and life of special sequence valve and liquid pressure system). Electricity consumption per ton ammonia decrease 30%, the preliminary equipment invest used for removing carbon can save 7%.

EXAMPLE 10

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.8 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs two times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', eleventh two-end equalization depressurization 2E11D', carbon dioxide product backward depressurization BD, second stage gas repressurization 2ER, eleventh two-end equalization repressurization 2E9R' tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization 2E2R' first two-end equalization repressurization 2E1R', final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E1D, second equalization depressurization E2D, cocurrent depressurization PP1, cocurrent depressurization PP2, cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The gas mixture discharged from the outlet of the adsorption tower of the second stage in adsorption step is mainly nitrogen and hydrogen product, wherein containing little carbon monoxide and methane in it. The gas discharged from the second stage in backward depressurization BD step and purge P1 step and purge P2 step and purge P3 step is returned into the adsorption tower of the first stage which has completed carbon dioxide product backward depressurization BD step totally to pressurize, abbr.2ER.

The result of this example is that the purity of carbon dioxide product is 98 v %. The recovery of carbon dioxide, hydrogen, nitrogen and carbon monoxide is above 99.9 v %. The concentration of carbon dioxide in hydrogen and nitrogen product is lower 0.2 v %, Electricity consumption is 2 kwh per ton ammonia. For this example, using the given adsorbents combination of the present invention and performing the steps at the same other conditions (e.g. adsorption pressure at 0.8 MPa(g), shift gas composition and temperature, adsorption cycle time, power equipment performance, apparatus and instrument and its control function, construction and life of special sequence valve and liquid pressure system). Electricity consumption per ton ammonia decrease 30%, the preliminary equipment invest used for removing carbon can save 7%.

EXAMPLE 11

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.9 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs two times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', carbon dioxide product backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization 2E7R', sixth equalization repressurization 2E6R', fifth equalization repressurization 2E5R', fourth equalization repressurization 2E4R', third equalization repressurization 2E3R', second equalization repressurization 2E2R' first equalization repressurization 2E1R', final repressurization FR. The gas obtained from the first stage in carbon dioxide product depressurization BD step is carbon dioxide product. In the second stage, the adsorption tower sequentially undergoes such pressure swing adsorption step in one circulation period as adsorption A, first equalization depressurization E1D, second equalization depressurization E2D, cocurrent depressurization PP1, cocurrent depressurization PP2, cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The gas mixture discharged from the outlet of the adsorption tower of the second stage in adsorption step is mainly nitrogen and hydrogen product, wherein containing little carbon monoxide and methane in it. The gas discharged from the second stage in backward depressurization BD step and purge P1 step and purge P2 step and purge P3 step is returned into the adsorption tower of the first stage which has completed carbon dioxide product backward depressurization BD step totally to pressurize, abbr. 2ER. The result of this example is that the purity of carbon dioxide product is 98 v %. The recovery of carbon dioxide, hydrogen, nitrogen and carbon monoxide is above 99.9 v %. The concentration of carbon dioxide in hydrogen and nitrogen product is lower 0.2 v %, Electricity consumption is 2 kwh per ton ammonia.

For this example, using the given adsorbents combination of the present invention and performing the steps at the same other conditions (e.g. adsorption pressure at 0.9 MPa(g), shift gas composition and temperature, adsorption cycle time, power equipment performance, apparatus and instrument and its control function, construction and life of special sequence valve and liquid pressure system). Electricity consumption per ton ammonia decrease 30%, the preliminary equipment invest used for removing carbon can save 7%.

EXAMPLE 12

The material gas in the present example is gas mixture containing hydrogen, such as light oil making gas, synthetic ammonia shift gas, syngas, synthetic ammonia deflating gas, methanol synthesis deflating gas, semi water gas, water gas and cracking dry gas and so on.

The components of light oil making gas are shown in the following table:

| | Component | | | | | | |
|---|---|---|---|---|---|---|---|
| | H2 | CO2 | CO | CH4 | O2 + Ar | Total sulfur | Water (steam) |
| Conc. % V | 69  72 | 15  20 | ≤2 | 6 | 3  7 | ≤0.8 | 150 mg/Nm3  saturation |

Temperature ≤40
Pressure 3.0 MPa G

In the first stage, the adsorbents in the adsorption tower from the bottom up in sequence are activated alumina and fine-porous-silicagel or activated alumina and activated carbon or activated alumina, activated carbon and molecular sieve. In the second stage, the adsorbents in the adsorption tower are activated carbon and molecular sieve or molecular sieve. This example is a pressure swing adsorption device for making hydrogen. In the gas mixture containing hydrogen, hydrogen is weakly adsorbed component, other components are strongly adsorbed component. In the first stage, the outlet hydrogen of the adsorption tower is controlled at over 80 v %, and strongly adsorbed components are concentrated to over 97 v %, but hydrogen in it is lower 0.6 v %; in the second stage, strongly adsorbed components in the outlet gas of the first stage is further purified to meet the requirement of the next procedure; hydrogen concentration at the top outlet of the adsorption tower of the second stage is controlled over 99.9 v %.

The first stage device comprises of thirteen adsorption towers. Single tower is simultaneously in an adsorption step and the pressure equalization step performs eleven times in the working procedure. The second stage device comprises of six adsorption towers. Single tower is simultaneously in an adsorption step and the pressure equalization step performs four times in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', eleventh two-end equalization depressurization 2E11D', backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization 2E2R', first two-end equalization repressurization 2E1R', final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, backward depressurization BD, fourth equalization repressurization E4R, third equalization repressurization E3R, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step totally to pressurize, abbr. 2ER.

The result of this example is that the concentration of hydrogen is over 99.9 v %, the recovery of hydrogen is over 99 v %.

EXAMPLE 13

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 1.8 MPa(g).

The first stage device comprises of thirteen adsorption towers. Single tower is simultaneously in an adsorption step and the pressure equalization step performs eleven times in the working procedure. The second stage device comprises of five adsorption towers. Single tower is simultaneously in an adsorption step and the pressure equalization step performs three times in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', eleventh two-end equalization depressurization 2E11D', backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization E2R', first two-end equalization repressurization 2E1R', final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, backward depressurization BD, third equalization repressurization E3R, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step totally to pressurize, abbr. 2ER.

The result of this example is that the concentration of hydrogen is over 99 v %, the recovery of hydrogen is over 98 v %.

EXAMPLE 14

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 3.0 MPa(g).

The first stage device comprises of thirteen adsorption towers. Single tower is simultaneously in an adsorption step and the pressure equalization step performs eleven times in the working procedure. The second stage device comprises of six adsorption towers, Single tower is simultaneously in an adsorption step and the pressure equalization step performs four times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, backward depressurization BD, fourth equalization repressurization E4R, third equalization repressurization E3R, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step totally to pressurize, abbr. 2ER.

The result of this example is that the concentration of hydrogen is over 99.9 v %, the recovery of hydrogen is over 99 v %.

EXAMPLE 15

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 1.8 MPa(g).

The first stage device comprises of thirteen adsorption towers. Single tower is simultaneously in an adsorption step and the pressure equalization step performs eleven times in the working procedure. The second stage device comprises of five adsorption towers Single tower is simultaneously in an adsorption step and the pressure equalization step performs three times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, backward depressurization BD, third equalization repressurization E3R, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step totally to pressurize, abbr. 2ER.

The result of this example is that the concentration of hydrogen is over 99 v %, the recovery of hydrogen is over 98 v %.

EXAMPLE 16

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.5 MPa(g).

The first stage device comprises of twelve adsorption towers. Single tower is simultaneously in an adsorption step and the pressure equalization step performs ten times in the working procedure. The second stage device comprises of five adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', backward depressurization BD, evacuation VC, second stage gas repressurization 2ER, tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization E4R, third two-end equalization repressurization 2E3R', second two-end equalization repressurization 2E2R', first two-end equalization repressurization 2E1R', final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, backward depressurization BD, evacuation VC, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step and evacuation VC step is returned into the adsorption tower of the first stage which has completed backward depressurization BD step totally to pressurize, abbr. 2ER.

The result of this example is that the concentration of hydrogen is over 99 v %, the recovery of hydrogen is over 99.5 v %.

EXAMPLE 17

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.5 MPa(g).

The first stage device comprises of thirteen adsorption towers. Single tower is simultaneously in an adsorption step and the pressure equalization step performs eleven times in the working procedure. The second stage device comprises of five adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', backward depressurization BD, evacuation VC, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, backward depressurization BD, evacuation VC, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step and evacuation VC step totally to pressurize, abbr. 2ER.

The result of this example is that the concentration of hydrogen is over 99 v %, the recovery of hydrogen is over 99.5 v %.

EXAMPLE 18

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.5 MPa(g).

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs four times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, two-end eighth equalization depressurization 2E8D', two-end ninth equalization depressurization 2E9D', two-end tenth equalization depressurization 2E10D', two-end eleventh equalization depressurization 2E11D', backward depressurization BD, evacuation VC, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, backward depressurization BD, evacuation VC, fourth equalization repressurization E4R, third equalization repressurization E3R, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step and evacuation VC step totally to pressurize, abbr. 2ER.

The result of this example is that the concentration of hydrogen is over 99 v %, the recovery of hydrogen is over 99.5 v %.

EXAMPLE 19

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.5 MPa(g).

The first stage device comprises of thirteen adsorption towers. Single tower simultaneously is in an adsorption step and the pressure equalization step performs eleven times in the working procedure. The second stage device comprises of four adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', backward depressurization BD, evacuation VC, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in backward depressurization BD step is vented or for other use. In the second stage, the adsorption tower sequentially undergoes such pressure swing adsorption step in one circulation period as adsorption A, first equalization depressurization E1D, second equalization depressurization E2D, backward depressurization BD, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step totally to pressurize, abbr. second gas repressurization 2ER.

The result of this example is that the concentration of hydrogen is over 99 v %, the recovery of hydrogen is over 99.5 v %.

EXAMPLE 20

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.8 MPa(g).

The first stage device comprises of thirteen adsorption towers. Single tower is simultaneously in an adsorption step and the pressure equalization step performs eleven times in the working procedure. The second stage device comprises of five adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', backward depressurization BD, evacuation VC, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in backward depressurization BD step is vented or for other use; In the second stage, the adsorption tower sequentially undergoes such pressure swing adsorption step in one circulation period as adsorption A, first equalization depressurization E1D, second equalization depressurization E2D, cocurrent depressurization PP, backward depressurization BD, purge P second equalization repressurization E2R, first equalization repressurization E1R, final repressurization FR. The gas mixture discharged from the adsorption tower in cocurrent depressurization PP step is used directly to purge the adsorption tower that has completed backward depressurization BD step by regulating its flow. The impurity adsorbed on the adsorbent is desorbed. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step and evacuation VC step totally to pressurize, abbr. 2ER.

The result of this example is that the concentration of hydrogen is over 99.9 v %, the recovery of hydrogen is over 99.8 v %.

EXAMPLE 21

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.8 MPa(g).

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', fifth two-end equalization depressurization 2E5D', sixth two-end equalization depressurization 2E6D', seventh two-end equalization depressurization 2E7D', eighth two-end equalization depressurization 2E8D', ninth two-end equalization depressurization 2E9D', tenth two-end equalization depressurization 2E10D', eleventh two-end equalization depressurization 2E11D', product backward depressurization BD, second stage gas repressurization 2ER, eleventh two-end equalization repressurization 2E9R' tenth two-end equalization repressurization 2E10R' ninth two-end equalization repressurization 2E9R' eighth two-end equalization repressurization 2E8R' seventh two-end equalization repressurization 2E7R', sixth two-end equalization repressurization 2E6R', fifth two-end equalization repressurization 2E5R', fourth two-end equalization repressurization 2E4R', third two-end equalization repressurization 2E3R', second two-end equalization repressurization 2E2R', first two-end equalization repressurization 2E1R', final repressurization FR. The gas obtained from the first stage in backward depressurization BD step is vented or for other use; In the second stage, the adsorption tower sequentially undergoes such pressure swing adsorption step in one circulation period as adsorption A, first equalization depressurization E1D, second equalization depressurization E2D, cocurrent depressurization PP1, cocurrent depressurization PP2, cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step and evacuation VC step totally to pressurize, abbr. 2ER.

The result of this example is that the concentration of hydrogen is over 99.9 v %, the recovery of hydrogen is over 99.8 v %.

EXAMPLE 22

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.9 MPa(g).

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth two-end equalization depressurization 2E8D', ninth two-end equalization depressurization 2E9D', tenth two-end equalization depressurization 2E10D', eleventh two-end equalization depressurization 2E11D', backward depressurization BD, second stage gas repressurization 2ER, eleventh two-end equalization repressurization 2E11R' tenth two-end equalization repressurization 2E10R' ninth two-end equalization repressurization 2E9R' eighth two-end equalization repressurization 2E8R' seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas obtained from the first stage in backward depressurization BD step is vented or for other use; In the second stage, the adsorption tower sequentially undergoes such pressure swing adsorption step in one circulation period as adsorption A, first equalization depressurization E1D, second equalization depressurization E2D, cocurrent depressurization PP1, cocurrent depressurization PP2, cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The product gas discharged from the outlet of the absorption tower of the second stage in adsorption step is mainly hydrogen. The gas discharged from the second stage in backward depressurization BD step is returned into the adsorption tower of the first stage which has completed backward depressurization BD step and evacuation VC step totally to pressurize, abbr. 2ER.

The result of this example is that the concentration of hydrogen is over 99.9 v %, the recovery of hydrogen is over 99.8 v %.

EXAMPLE 23

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 3.0 MPa(g), the transporting pressure of carbon dioxide product is 0.005 MPa.

The first stage device comprises of twelve adsorption towers. Single tower is simultaneously in an adsorption step and the pressure equalization step performs ten times in the working procedure. The second stage device comprises of eight adsorption towers. Single tower is simultaneously in an adsorption step and the pressure equalization step performs six times in the working procedure. In the first stage, carbon dioxide is purified to over 98.5 v % for synthesizing carbamide. In the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, first backward depressurization BD1, second carbon dioxide product backward depressurization BD2, first stage gas repressurization 2ER1, second stage gas repressurization 2ER, tenth equalization repressurization E10R, ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E10D step, the concentration of carbon dioxide at the top of the adsorption tower is over 70 v %; after BD1 step, the concentration of carbon dioxide at the bottom of the adsorption tower is over 75 v %. The gas discharged from BD1 step is returned into the adsorption tower of the first stage to pressurize at its bottom. The gas obtained from the first stage in second carbon dioxide product backward depressurization BD2 step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, backward depressurization BD, sixth equalization repressurization E6R, fifth equalization repressurization E5R, fourth equalization repressurization E4R, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step is returned into the adsorption tower of the first stage which has completed second carbon dioxide product backward depressurization BD2 step totally to pressurize, abbr. 2ER.

The result of this example is that the purity of carbon dioxide product is 98.5 v %, the recovery of carbon dioxide, hydrogen, nitrogen and carbon monoxide is above 99.9 v %. The concentration of carbon dioxide in hydrogen and nitrogen product is lower 0.2 v %, Electricity consumption is 2 kwh per ton ammonia used for instrument and light.

For this example, using the given adsorbents combination of the present invention and performing the steps at the same other conditions (e.g. adsorption pressure at 3.0 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 24

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.7 MPa(g), the transporting pressure of carbon dioxide product is 0.005 MPa.

The first stage device comprises of twelve adsorption towers. Single tower is simultaneously in an adsorption step and the pressure equalization step performs ten times in the working procedure. The second stage device comprises of six adsorption towers. Single tower is simultaneously in an adsorption step and the pressure equalization step performs three times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, first backward depressurization BD1, second carbon dioxide product backward depressurization BD2, evacuation VC, first stage gas repressurization 2ER1, second stage gas repressurization 2ER, tenth equalization repressurization E10R, ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E11R, final repressurization FR. After E10D step, the concentration of carbon dioxide at the top of the adsorption tower is over 70 v %; after BD1 step, the concentration of carbon dioxide at the bottom of the adsorption tower is over 75 v %. The gas discharged from BD1 step is returned into the adsorption tower of the first stage to pressurize at its bottom. The gas obtained from the first stage in second carbon dioxide product backward depressurization BD2 step and evacuation VC step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, backward depressurization BD, evacuation VC, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step and evacuation VC step is returned into the adsorption tower of the first stage which has completed evacuation VC step totally to pressurize, abbr. 2ER.

The result of this example is that the purity of carbon dioxide product is 98% (v), the recovery of carbon dioxide is above 99 v %, the recovery of hydrogen, nitrogen and carbon monoxide is above 99.9 v %. The concentration of carbon dioxide in hydrogen and nitrogen product is lower 0.2 v %, Electricity consumption 95 kwh per ton ammonia used for instrument and light.

For this example, using the given adsorbents combination of the present invention and performing the steps at the same other conditions (e.g. adsorption pressure at 0.6 MPa(g), shift gas composition and temperature, adsorption cycle time, power equipment performance, apparatus and instrument and its control function, construction and life of special sequence valve and liquid pressure system), the preliminary equipment invest used for removing carbon can save 12%.

EXAMPLE 25 OF INVENTION

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.8 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs four times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, eleventh equalization depressurization E11D, first backward depressurization BD1, second carbon dioxide product backward depressurization BD2, first stage gas repressurization 2ER1, second stage gas repressurization 2ER, eleventh equalization repressurization E11R, tenth equalization repressurization E10R, ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E11D step, the concentration of carbon dioxide at the top of the adsorption tower is over 70 v %; after BD1 step, the concentration of carbon dioxide at the bottom of the adsorption tower is over 75 v %. The gas discharged from BD1 step is returned into the adsorption tower of the first stage to pressurize at its bottom. The gas obtained from the first stage in second carbon dioxide product backward depressurization BD2 step is carbon dioxide product. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, backward depressurization BD, evacuation VC, fourth equalization repressurization E4R, third equalization repressurization E3R, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step and evacuation VC step is returned into the adsorption tower of the first stage which has completed carbon dioxide product backward depressurization BD step totally to pressurize, abbr. 2ER.

The result of this example is that the purity of carbon dioxide product is 98 v %, the recovery of carbon dioxide, hydrogen, nitrogen and carbon monoxide is above 99.9 v %. The concentration of carbon dioxide in hydrogen and nitrogen product is lower 0.2 v %, Electricity consumption 65 kwh per ton ammonia used for instrument and light.

For this example, using the given adsorbents combination of the present invention and performing the steps at the same other conditions (e.g. adsorption pressure at 0.8 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 26

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.6 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of four adsorption towers. Single tower is simultaneously in an adsorption step and the pressure equalization step performs two times in the working procedure. In the first stage, carbon dioxide is purified to over 98 v % for synthesizing carbamide; in the second stage, the outlet gas of the first stage is further purified to meet the requirement of the next program in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, eleventh equalization depressurization E11D, first backward depressurization BD1, second carbon dioxide product backward depressurization BD2, evacuation VC, first stage gas repressurization 2ER1, second stage gas repressurization 2ER, eleventh equalization repressurization E11R, tenth equalization repressurization E10R, ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E10D step, the concentration of carbon dioxide at the top of the adsorption tower is over 70 v %; after BD1 step, the concentration of carbon dioxide at the bottom of the adsorption tower is over 75 v %. The gas discharged from BD1 step is returned into the adsorption tower of the first stage to pressurize at its bottom. The gas obtained from the first stage in second carbon dioxide product backward depressurization BD2 step and evacuation VC step is carbon dioxide product. In the second stage, the adsorption tower sequentially undergoes such pressure swing adsorption step in one circulation period as adsorption A, first equalization depressurization E1D, second equalization depressurization E2D, backward depressurization BD, second equalization repressurization E2R, first equalization repressurization E1R, final repressurization FR. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step is returned into the adsorption tower of the first stage which has completed evacuation VC step totally to pressurize, abbr. 2ER.

The result of this example is that the purity of carbon dioxide product is ~98 v %, the recovery of carbon dioxide, hydrogen, nitrogen and carbon monoxide is above 99.9 v %. The concentration of carbon dioxide in hydrogen and nitrogen product is lower 0.8 v %, Electricity consumption 52 kwh per ton ammonia used for instrument and light.

For this example, using the given adsorbents combination of the present invention and performing the steps at the same other conditions (e.g. adsorption pressure at 0.6 MPa(g), shift gas composition and temperature, adsorption cycle time, power equipment performance, apparatus and instrument and its control function, construction and life of special sequence valve and liquid pressure system), the preliminary equipment invest used for removing carbon can save 7%.

EXAMPLE 27

The conditions of this example, such as shift gas composition and temperature, adsorbent style, power equipment performance, apparatus and instrument and its control function, construction and life of special sequence valve and liquid pressure system and so on other conditions are all the same with those in example 1. The adsorption pressure in this example is 0.9 MPa(g), the transporting pressure of carbon dioxide product is 0.005 MPa.

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs two times in the working procedure. In the first stage, carbon dioxide is purified to over 98 v % for synthesizing carbamide; in the second stage, the outlet gas of the first stage is further purified to meet the requirement of the next procedure in synthetic ammonia production. The concentration of carbon dioxide in hydrogen, nitrogen at the top outlet of the adsorption tower of the second stage is controlled lower 0.2 v %.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, eleventh equalization depressurization E11D, first backward depressurization BD1, second carbon dioxide product backward depressurization BD2, first stage gas repressurization 2ER1, second stage gas repressurization 2ER, eleventh equalization repressurization E11R, tenth equalization repressurization E10R, ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E11D step, the concentration of carbon dioxide at the top of the adsorption tower is over 70 v %; after BD1 step, the concentration of carbon dioxide at the bottom of the adsorption tower is over 75 v %. The gas discharged from BD1 step is returned into the adsorption tower of the first stage to pressure at its bottom. The gas obtained from the first stage in second carbon dioxide product backward depressurization BD2 step is carbon dioxide product. In the second stage, the adsorption tower sequentially undergoes such pressure swing adsorption step in one circulation period as adsorption A, first equalization depressurization E1D, second equalization depressurization E2D, cocurrent depressurization PP1, cocurrent depressurization PP2, cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The gas mixture discharged from the outlet of the absorption tower of the second stage in adsorption step is mainly nitrogen and hydrogen product, wherein containing little carbon monoxide and methane in it. The gas discharged from the second stage in backward depressurization BD step and purge P1 step and purge P2 step and purge P3 step is returned into the adsorption tower of the first stage which has completed second carbon dioxide product backward depressurization BD2 step totally to pressurize, abbr. 2ER.

The result of this example is that the purity of carbon dioxide product is 98 v %, the recovery of carbon dioxide, hydrogen, nitrogen and carbon monoxide is above 99.9 v %. The concentration of carbon dioxide in hydrogen and nitrogen product is lower 0.2 v %, Electricity consumption is 2 kwh per ton ammonia used for instrument and light.

For this example, using the given adsorbents combination of the present invention and performing the steps at the same other conditions (e.g. adsorption pressure at 0.9 MPa(g), shift gas composition and temperature, adsorption cycle time, power equipment performance, apparatus and instrument and its control function, construction and life of special sequence valve and liquid pressure system). Electricity consumption per ton ammonia decrease 30%, the preliminary equipment invest used for removing carbon can save 7%.

EXAMPLE 28

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 3.0 MPa(g).

The first stage device comprises of twelve adsorption towers. Single tower is simultaneously in an adsorption step and the pressure equalization step performs ten times in the working procedure. The second stage device comprises of eight adsorption towers Single tower is simultaneously in an adsorption step and the pressure equalization step performs six times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, first backward depressurization BD1, second backward depressurization BD2, first stage gas repressurization 2ER1, second stage gas repressurization 2ER, tenth equalization repressurization E10R ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E10D step, the concentration of the strongly adsorbed component at the top of the adsorption tower is over 70 v %; after BD1 step, the concentration of the strongly adsorbed component at the bottom of the adsorption tower is over 75 v %. The gas discharged from BD1 step is returned into the adsorption tower of the first stage to pressurize at its bottom. The gas obtained from the first stage in first backward depressurization BD1 step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, backward depressurization BD, sixth equalization repressurization E6R, fifth equalization repressurization E5R, fourth equalization repressurization E4R, third equalization repressurization E3R, second equalization repressurization E2R, first equalization repressurization E11R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed second backward depressurization BD step totally to pressurize, abbr. 2ER.

The result of this example is that the concentration of hydrogen is over 99.9 v %, the recovery of hydrogen is over 99.8 v %.

EXAMPLE 29

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.7 MPa(g).

The first stage device comprises of twelve adsorption towers. Single tower is simultaneously in an adsorption step and the pressure equalization step performs ten times in the working procedure. The second stage device comprises of six adsorption towers. Single tower is simultaneously in an adsorption step and the pressure equalization step performs three times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, first backward depressurization BD1, second backward depressurization BD2, evacuation VC, first stage gas repressurization 2ER1, second stage gas repressurization 2ER, tenth equalization repressurization E10R ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E10D step, the concentration of the strongly adsorbed component at the top of the adsorption tower is over 70 v %; after BD1 step, the concentration of the strongly adsorbed component at the bottom of the adsorption tower is over 75 v %. The gas discharged from BD1 step is returned into the adsorption tower of the first stage to pressure at its bottom. The gas obtained from the first stage in second backward depressurization BD2 step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, backward depressurization BD, evacuation VC, third equalization repressurization E3R, second equalization repressurization E2R, first equalization repressurization E11R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed evacuation VC step totally to pressurize, abbr. 2ER.

The result of this example is that the concentration of hydrogen is over 99.9 v %, the recovery of hydrogen is over 99.9 v %.

EXAMPLE 30

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.8 MPa(g).

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs four times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, eleventh equalization depressurization E11D, first backward depressurization BD1, second backward depressurization BD2, first stage gas repressurization 2ER1, second stage gas repressurization 2ER, eleventh equalization repressurization E11R tenth equalization repressurization E10R ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E11D step, the concentration of the strongly adsorbed component at the top of the adsorption tower is over 70 v %; after BD1 step, the concentration of the strongly adsorbed component at the bottom of the adsorption tower is over 75 v %. The gas discharged from BD1 step is returned into the adsorption tower of the first stage to pressure at its bottom. The gas obtained from the first stage in second backward depressurization BD2 step is vented or for other use. In the second stage, the adsorption tower sequentially undergoes such pressure swing adsorption step in one circulation period as adsorption A, first equalization depressurization E1D, second equalization depressurization E2D, third equalization depressurization E3D, fourth equalization depressurization E4D, backward depressurization BD, evacuation VC, fourth equalization repressurization E4R, third equalization repressurization E3R, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed second backward depressuriation BD2 step totally to pressurize, abbr. 2ER.

The result of this example is that the concentration of hydrogen is over 99.9 v %, the recovery of hydrogen is over 99.9 v %.

EXAMPLE 31

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.6 MPa(g).

The first stage device comprises of thirteen adsorption towers. Single tower is simultaneously in an adsorption step and the pressure equalization step performs eleven times in the working procedure. The second stage device comprises of four adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, eleventh equalization depressurization E11D, first backward depressurization BD1, second carbon dioxide product backward depressurization BD2, evacuation VC, first stage gas repressurization 2ER1, second stage gas repressurization 2ER, eleventh equalization repressurization E11R tenth equalization repressurization E10R ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E11D step, the concentration of the strongly adsorbed component at the top of the adsorption tower is over 70 v %; after BD1 step, the concentration of the strongly adsorbed component at the bottom of the adsorption tower is over 75 v %. The gas discharged from BD1 step is returned into the adsorption tower of the first stage to pressure at its bottom. The gas obtained from the first stage in second backward depressurization BD2 step is vented or for other use. In the second stage, the adsorption tower sequentially undergoes such pressure swing adsorption step in one circulation period as adsorption A, first equalization depressurization E1D, second equalization depressurization E2D, backward depressurization BD, second equalization repressurization E2R, first equalization repressurization E1R, final repressurization FR. The product gas discharged from the outlet of the absorption tower of the second stage in adsorption step is mainly hydrogen. The gas discharged from the second stage in backward depressurization BD step is returned into the adsorption tower of the first stage which has completed evacuation VC step totally to pressurize, abbr. 2ER.

The result of this example is that the concentration of hydrogen is over 99.9 v %, the recovery of hydrogen is over 99.9 v %.

EXAMPLE 32

The conditions of this example, such as material gas composition and temperature, adsorbent style, power equipment performance, apparatus and instrument and its control function, construction and life of special sequence valve and liquid pressure system and so on other conditions are all the same with those in example 12. The adsorption pressure in this example is 0.6 MPa(g).

The first stage device comprises of thirteen adsorption towers. Single tower is simultaneously in an adsorption step and the pressure equalization step performs eleven times in the working procedure. The second stage device comprises of seven adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first equalization depressurization E1D, second equalization depressurization E2D, third equalization depressurization E3D, fourth equalization depressurization E4D, fifth equalization depressurization E5D, sixth equalization depressurization E6D, seventh equalization depressurization E7D, eighth equalization depressurization E8D, ninth equalization depressurization E9D, tenth equalization depressurization E10D, eleventh equalization depressurization E11D, first backward depressurization BD1, second backward depressurization BD2, first stage gas repressurization 2ER1, second stage gas repressurization 2ER, eleventh equalization repressurization E11R tenth equalization repressurization E10R ninth equalization repressurization E9R eighth equalization repressurization E8R seventh equalization repressurization E7R, sixth equalization repressurization E6R, fifth equalization repressurization E5R, fourth equalization repressurization E4R, third equalization repressurization E3R, second equalization repressurization E2R, first equalization repressurization E1R, final repressurization FR. After E11D step, the concentration of the strongly adsorbed component at the top of the adsorption tower is over 70 v %; after BD1 step, the concentration of the strongly adsorbed component at the bottom of the adsorption tower is over 75 v %. The gas discharged from BD1 step is returned into the adsorption tower of the first stage to pressurize at its bottom. The gas obtained from the first stage in second backward depressurization BD2 step is vented or for other use. In the second stage, the adsorption tower sequentially undergoes such pressure swing adsorption step in one circulation period as adsorption A, first equalization depressurization E1D, second equalization depressurization E2D, cocurrent depressurization PP1 cocurrent depressurization PP2 cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The product gas discharged from the outlet of the absorption tower of the second stage in adsorption step is mainly hydrogen. The gas discharged from the second stage in backward depressurization BD step is returned into the adsorption tower of the first stage which has completed second backward depressurization BD2 step totally to pressurize, abbr. 2ER.

The result of this example is that the concentration of hydrogen is over 99.9 v %, the recovery of hydrogen is over 99.8 v %.

EXAMPLE 33

The material gas in the present example is air.
The components of air are shown in the following table:

|  | Component | | | |
| --- | --- | --- | --- | --- |
|  | N2 | O2 | Ar | Water (steam) |
| Conc. % V | 78 | 21 | 1 | saturation |

Temperature ≤40
Pressure 0.15 MPa G

In the first stage, the adsorbents in the adsorption tower from the bottom up in sequence are activated alumina and molecular sieve. In the second stage, the adsorbent in the adsorption tower is molecular sieve. This example is a pressure swing adsorption device for making oxygen. In air, oxygen and argon is weakly adsorbed component, nitrogen and water(steam) is strongly adsorbed component. In the first stage, outlet nitrogen concentration is controlled at 78 v % (adjusting between 30-78 v % during actual operation); in the second stage, nitrogen in the outlet gas of the first stage is further purified to meet the requirement of the next procedure Oxygen concentration at the top outlet of the adsorption tower of the second stage is controlled at over 93 v %, maximum to 95 v %.

The first stage device comprises of seven adsorption towers. Single tower is simultaneously in an adsorption step and the pressure equalization step performs four times in the working procedure. The second stage device comprises of four adsorption towers. Single tower is simultaneously in an adsorption step and the pressure equalization step performs once in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', evacuation VC, second stage gas repressurization 2ER, fourth two-end equalization repressurization 2E4R', third two-end equalization repressurization 2E3R', second two-end equalization repressurization 2E2R' first two-end equalization repressurization 2E1R', final repressurization FR. In the second stage, the adsorption tower sequentially undergoes such pressure swing adsorption step in one circulation period as adsorption A, first equalization depressurization E1D, backward depressurization BD, first equalization repressurization E1R, final repressurization FR. The gas discharged from backward depressurization BD step is returned into the adsorption tower of the first stage which has completed evacuation VC step totally to pressurize. The product gas discharged from the outlet of the absorption tower of the second stage in adsorption step is mainly oxygen and a little argon.

The result of this example is that the concentration of oxygen is above 93 v %, the concentration of nitrogen is above 99 v %, the recovery of oxygen is above 96.2 v %.

EXAMPLE 34

The material gas in the present example is air.
The components of air are shown in the following table:

|  | Component | | | |
| --- | --- | --- | --- | --- |
|  | N2 | O2 | Ar | Water (steam) |
| Conc. % V | 78 | 21 | 1 | saturation |

Temperature ≤40
Pressure 0.15 MPa G

In the first stage, the adsorbents in the adsorption tower from the bottom up in sequence are activated alumina and molecular sieve. In the second stage, the adsorbent in the adsorption tower is molecular sieve. This example is a pressure swing adsorption device for making oxygen. In air, oxygen and argon is weakly adsorbed component, nitrogen and water(steam) is strongly adsorbed component. In the first stage, outlet nitrogen concentration is controlled at 78 v % (adjusting between 30-78 v % during actual operation); in the second stage, nitrogen in the outlet gas of the first stage is further purified to meet the requirement of the next procedure. Oxygen concentration at the top outlet of the adsorption tower of the second stage is controlled at over 93 v %, maximum to 95 v %.

The first stage device comprises of six adsorption towers. Single tower is simultaneously in an adsorption step and the pressure equalization step performs three times in the working procedure. The second stage device comprises of four adsorption towers. Single tower is simultaneously in an adsorption step and the pressure equalization step performs once in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', backward depressurization BD, evacuation VC, second stage gas repressurization 2ER, third two-end equalization repressurization 2E3R', second two-end equalization repressurization 2E2R first two-end equalization repressurization 2E1R', final repressurization FR. In the second stage, the adsorption tower sequentially undergoes such pressure swing adsorption step in one circulation period as adsorption A, first equalization depressurization E1D, backward depressurization BD, first equalization repressurization E1R, final repressurization FR. The gas discharged from backward depressurization BD step is returned into the adsorption tower of the first stage which has completed evacuation VC step totally to pressurize. The product gas discharged from the outlet of the absorption tower of the second stage in adsorption step is mainly oxygen and a little argon.

The result of this example is that the concentration of oxygen is above 93 v %, the concentration of nitrogen is above 99 v %, the recovery of oxygen is above 96 v %.

EXAMPLE 35 OF INVENTION

The material gas in the present example is air.
The components of air are shown in the following table:

|  | Component | | | |
|---|---|---|---|---|
|  | N2 | O2 | Ar | Water (steam) |
| Conc. % V | 78 | 21 | 1 | saturation |

Temperature ≤40
Pressure 0.3 MPa G

In the first stage, the adsorbents in the adsorption tower from the bottom up in sequence are activated alumina and molecular sieve. In the second stage, the adsorbent in the adsorption tower is molecular sieve. This example is a pressure swing adsorption device for making oxygen. In air, oxygen and argon is weakly adsorbed component, nitrogen and water(steam) is strongly adsorbed component. In the first stage, outlet nitrogen concentration is controlled at over 78 v %; in the second stage, nitrogen in the outlet gas of the first stage is further purified to meet the requirement of the next procedure. Oxygen concentration at the top outlet of the adsorption tower of the second stage is controlled at over 93 v %, maximum to 95 v %.

The first stage device comprises of seven adsorption towers. Single tower is simultaneously in an adsorption step and the pressure equalization step performs four times in the working procedure. The second stage device comprises of five adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', backward depressurization BD, evacuation VC, second stage gas repressurization 2ER, fourth two-end equalization repressurization 2E4R', third two-end equalization repressurization 2E3R', second two-end equalization repressurization 2E2R' first two-end equalization repressurization 2E1R', final repressurization FR. In the second stage, the adsorption tower sequentially undergoes such pressure swing adsorption step in one circulation period as adsorption A, first equalization depressurization E1D, second equalization depressurization E2D, backward depressurization BD, second equalization repressurization E2R, first equalization repressurization E1R, final repressurization FR. The gas discharged from backward depressurization BD step is returned into the adsorption tower of the first stage which has completed evacuation VC step totally to pressurize. The product gas discharged from the outlet of the absorption tower of the second stage in adsorption step is mainly oxygen and a little argon.

The result of this example is that the concentration of oxygen is above 93 v %, the concentration of nitrogen is above 99.7 v %, the recovery of oxygen is above 99 v %.

EXAMPLE 36 OF INVENTION

The material gas in the present example is air.
The components of air are shown in the following table:

|  | Component | | | |
|---|---|---|---|---|
|  | N2 | O2 | Ar | Water (steam) |
| Conc. % V | 78 | 21 | 1 | saturation |

Temperature ≤40
Pressure 0.3 MPa G

In the first stage, the adsorbents in the adsorption tower from the bottom up in sequence are activated alumina and molecular sieve in the second stage, the adsorbent in the adsorption tower is molecular sieve. This example is a pressure swing adsorption device for making oxygen. In air, oxygen and argon is weakly adsorbed component, nitrogen and water(steam) is strongly adsorbed component. In the first stage, outlet nitrogen concentration is controlled at 78 v % (adjusting between 20-78 v % during actual operation); in the second stage, nitrogen in the outlet gas of the first stage is further purified to meet the requirement of the next procedure. Oxygen concentration at the top outlet of the adsorption tower of the second stage is controlled at over 93 v %, maximum to 95 v %.

The first stage device comprises of seven adsorption towers. Single tower is simultaneously in an adsorption step and the pressure equalization step performs four times in the working procedure. The second stage device comprises of seven adsorption towers. Single tower is simultaneously in an adsorption step and the pressure equalization step performs two times in the working procedure.

In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', backward depressurization BD, evacuation VC, second stage gas repressurization 2ER, fourth two-end equalization repressurization 2E4R', third two-end equalization repressurization 2E3R', second two-end equalization repressurization 2E2R' first two-end equalization repressurization 2E1R', final repressurization FR. In the second stage, the adsorption tower sequentially undergoes such pressure swing adsorption step in one circulation period as adsorption A, first equalization depressurization E1D, second equalization depressurization E2D, cocurrent depressurization PP1, cocurrent depressurization PP2, cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The gas discharged from backward depressurization BD step and purge P step is returned into the adsorption tower of the first stage which has completed evacuation VC step totally to pressurize. The product gas discharged from the outlet of the absorption tower of the second stage in adsorption step is mainly oxygen and a little argon.

The result of this example is that the concentration of oxygen is above 93 v %, the concentration of nitrogen is above 99.7 v %, the recovery of oxygen is above 99 v %.

EXAMPLE 37 OF INVENTION

The material gas in the present example is air.
The components of air are shown in the following table:

|  | Component | | | |
| --- | --- | --- | --- | --- |
|  | N2 | O2 | Ar | Water (steam) |
| Conc. % V | 78 | 21 | 1 | saturation |

Temperature ≦40
Pressure 0.3 MPa G

In the first stage, the adsorbents in the adsorption tower from the bottom up in sequence are activated alumina and molecular sieve in the second stage, the adsorbent in the adsorption tower is molecular sieve. This example is a pressure swing adsorption device for making oxygen. In air, oxygen and argon is weakly adsorbed component, nitrogen and water(steam) is strongly adsorbed component. In the first stage, outlet nitrogen concentration is controlled at 78 v % (adjusting between 20-78 v % during actual operation); in the second stage, nitrogen in the outlet gas of the first stage is further purified to meet the requirement of the next procedure. Oxygen concentration at the top outlet of the adsorption tower of the second stage is controlled at over 93 v %, maximum to 95 v %.

The first stage device comprises of seven adsorption towers. Single tower is simultaneously in an adsorption step and the pressure equalization step performs four times in the working procedure. The second stage device comprises of seven adsorption towers. Single tower is simultaneously in an adsorption step and the pressure equalization step performs two times in the working procedure. In the first stage, the adsorption tower sequentially undergoes such pressure swing adsorption steps in one circulation period as adsorption A, first two-end equalization depressurization 2E1D', second two-end equalization depressurization 2E2D', third two-end equalization depressurization 2E3D', fourth two-end equalization depressurization 2E4D', backward depressurization BD, second stage gas repressurization 2ER, fourth two-end equalization repressurization 2E4R', third two-end equalization repressurization 2E3R', second two-end equalization repressurization 2E2R' first two-end equalization repressurization 2E1R', final repressurization FR. In the second stage, the adsorption tower sequentially undergoes such pressure swing adsorption step in one circulation period as adsorption A, first equalization depressurization E1D, second equalization depressurization E2D, cocurrent depressurization PP1, cocurrent depressurization PP2, cocurrent depressurization PP3, backward depressurization BD, purge P1, purge P2, purge P3, second equalization repressurization E2R, first equalization repressurization E1R, final repressurization FR. The gas mixture discharged from the adsorption tower in cocurrent depressurization PP1 step is used directly to purge the adsorption tower that has completed purge P2 step by regulating its flow. The impurity adsorbed on the adsorbent is desorbed. The gas mixture discharged from the adsorption tower in cocurrent depressurization PP2 step is used directly to purge the adsorption tower that has completed purge P1 step by regulating its flow. The gas mixture discharged from the adsorption tower in cocurrent depressurization PP3 step is used directly to purge the adsorption tower that has completed backward depressurization BD step by regulating its flow. The impurity adsorbed on the adsorbent is desorbed. The gas discharged from backward depressurization BD step and purge P step is returned into the adsorption tower of the first stage which has completed evacuation VC step totally to pressurize. The product gas discharged from the outlet of the absorption tower of the second stage in adsorption step is mainly oxygen and a little argon.

The result of this example is that the concentration of oxygen is above 93 v %, the concentration of nitrogen is above 99.7 v %, the recovery of oxygen is above 99 v %.

The present invention is not limited to the application scope mentioned above. It can be used to obtain the strongly adsorbed or the weakly adsorbed component from the gas mixture, and to obtain the strongly adsorbed component and the weakly adsorbed component from the gas mixture at the same time. The strongly adsorbed component and the weakly adsorbed component in the present invention can be one component, also can be more than one component.

INDUSTRIAL APPLICATION

The present invention can be applied to the industrial field of chemical engineering, petrochemical processing, pharmacy, building materials, environmental protection and so on.

I claim:

1. A two-stage complete recycle pressure-swing adsorption process for gas Separation, wherein the process is used to separate the strongly adsorbed component and the weakly adsorbed component from the gas mixture; the process adopts two-stage pressure-swing adsorption device operating in series; the gas mixture is fed into the first stage pressure-swing adsorption device, and the strongly adsorbed component of the gas mixture is adsorbed and is concentrated as product; the interim gas mixture from the outlet of the adsorption tower of the first stage pressure-swing adsorption device is fed into the second stage pressure-swing adsorption device; the strongly adsorbed component in the interim gas mixture is adsorbed further, and the nonadsorbed weakly adsorbed component acts as product and is fed into next step; all of the gas excepting for the weakly adsorbed component entering into next step in the second stage is returned into the first stage to increase the pressure of the adsorption tower; the adsorption tower of the first stage sequentially undergoes the following steps in one circulation period: adsorption step A, two-end equalization depressurization 2ED', backward depressurization BD, second stage gas repressurization 2ER, two-end equalization repressurization 2ER' and final repressurization FR; the adsorption tower of the second stage sequentially undergoes the following steps in one circulation period: adsorption A, cocurrent equalization depressurization ED, backward depressurization BD, backward equalization repressurization ER and final repressurization FR, wherein during said two-end equalization depressurization step, the gas discharged at different times from both the inlet and the outlet of the adsorption tower enters into the adsorption tower which has completed the first stage regeneration step to pressurize, wherein the outlet of the depressurization adsorption tower is connected to the outlet of the pressurization adsorption tower that has been purged; and the inlet of the depressurization adsorption tower is connected to the inlet of the pressurization adsorption tower that has been purged.

2. The process according to claim 1, wherein the adsorption tower of the first stage adds the cocurrent equalization depressurization ED step after the adsorption A step; at the same time, the adsorption tower of the first stage adds the backward equalization repressurization ER step after the two-end equalization repressurization 2ER'.

3. The process according to claim 1 or 2, wherein the adsorption tower of the first stage adds the evacuation step VC after the backward depressurization step BD or/and the adsorption tower of the second stage adds the evacuation step VC after the backward depressurization step BD.

4. The process according to claim 1 or 2 wherein the adsorption tower of the second stage adds the cocurrent depressurization step PP after the cocurrent equalization depressurization ED; at the same time, the adsorption tower of the second stage adds the purge step P after the backward depressurization step BD; the gas of the purge step P comes from the adsorption tower which is in the cocurrent depressurization step PP directly or comes from the buffer vessel V that is used to store the gas of the cocurrent depressurization step PP.

5. The process according to claim 3 wherein the adsorption tower of the second stage adds the cocurrent depressurization step PP after the cocurrent equalization depressurization ED; at the same time, the adsorption tower of the second stage adds the purge step P after the backward depressurization step BD; the gas of the purge step P comes from the adsorption tower which is in the cocurrent depressurization step PP directly or comes from the buffer vessel V that is used to store the gas of the cocurrent depressurization step PP.

6. The process according to claim 1 or 2, wherein the adsorption tower of the second stage adds the first cocurrent depressurization step PP1 and the second cocurrent depressurization step PP2 after the cocurrent equalization depressurization step ED; at the same time, the adsorption tower of the second stage adds the first purge step P1 and the second purge step P2 after the backward depressurization step BD; the gas of the first purge step P1 comes from the adsorption tower which is in the second cocurrent depressurization step PP2 directly or comes from the buffer vessel V1 that is used to store the gas of the second cocurrent depressurization step PP2; the gas of the second purge step P2 comes from the adsorption tower which is in the first cocurrent depressurization step PP1 directly or comes from the buffer vessel V2 that is used to store the gas of the first cocurrent depressurization step PP1.

7. The process according to claim 3, wherein the adsorption tower of the second stage adds the first cocurrent depressurization step PP1 and the second cocurrent depressurization step PP2 after the cocurrent equalization depressurization step ED; at the same time, the adsorption tower of the second stage adds the first purge step P1 and the second purge step P2 after the backward depressurization step BD; the gas of the first purge step P1 comes from the adsorption tower which is in the second cocurrent depressurization step PP2 directly or comes from the buffer vessel V1 that is used to store the gas of the second cocurrent depressurization step PP2; the gas of the second purge step P2 comes from the adsorption tower which is in the first cocurrent depressurization step PP1 directly or comes from the buffer vessel V2 that is used to store the gas of the first cocurrent depressurization step PP1.

8. The process according to claim 1 or 2, wherein the adsorption tower of the second stage adds the first cocurrent depressurization step PP1 and the second cocurrent depressurization step PP2 and the third cocurrent depressurization step PP3 after the cocurrent equalization depressurization step ED; at the same time, the adsorption tower of the second stage adds the first purge step P1 and the second purge step P2 and the third purge step P3 after the backward depressurization step BD; the gas of the first purge step P1 comes from the adsorption tower which is in the third cocurrent depressurization step PP3 directly or comes from the buffer vessel V3 that is used to store the gas of the third cocurrent depressurization step PP3; the gas of the second purge step P2 comes from the adsorption tower which is in the second cocurrent depressurization step PP2 directly or comes from the buffer vessel V4 that is used to store the gas of the second cocurrent depressurization step PP2; the gas of the third purge step P3 comes from the adsorption tower which is in the first cocurrent depressurization step PP1 directly or comes from the buffer vessel V5 that is used to store the gas of the first cocurrent depressurization step PP1.

9. The process according to claim 3, wherein the adsorption tower of the second stage adds the first cocurrent depressurization step PP1 and the second cocurrent depressurization step PP2 and the third cocurrent depressurization step PP3 after the cocurrent equalization depressurization step ED; at the same time, the adsorption tower of the second stage adds the first purge step P1 and the second purge step P2 and the third purge step P3 after the backward depressurization step BD; the gas of the first purge step P1 comes from the adsorption tower which is in the third cocurrent depressurization step PP3 directly or comes from the buffer vessel V3 that is used to store the gas of the third cocurrent depressurization step PP3; the gas of the second purge step P2 comes from the adsorption tower which is in the second cocurrent depressurization step PP2 directly or comes from the buffer vessel V4 that is used to store the gas of the second cocurrent depressurization step PP2; the gas of the third purge step P3 comes from the adsorption tower which is in the first cocurrent depressurization step PP1 directly or comes from the buffer vessel V5 that is used to store the gas of the first cocurrent depressurization step PP1.

10. The process according to claim 1 or 2, wherein in the first stage, the average concentration of the strongly adsorbed components in the gas mixture finally discharged from the top of the adsorption tower after the two-end equalization depressurization step 2ER' is over 30%.

11. The process according to claim 10, wherein in the first stage, the average concentration of the strongly adsorbed components in the gas mixture finally discharged from the top of the adsorption tower after the two-end equalization depressurization step 2ER' is over 75%.

12. The process according to claim 1 or 2, wherein the gas discharged from the adsorption tower is discharged into a buffer vessel V6 at first and then a buffer vessel V7 when the adsorption tower is performing the backward depressurization step BD in the second stage.

13. The process according to claim 3, wherein the gas discharged from the adsorption tower is discharged into a buffer vessel V6 at first and then a buffer vessel V7 when the adsorption tower is performing the backward depressurization step BD in the second stage.

14. The process according to claim 1 or 2, wherein in the first stage, the average concentration of the strongly adsorbed components in the outlet gas of the adsorption step is over or equal to 2 v %.

15. The process according to claim 1 or 2, wherein the pressure of the raw material gas mixture is over or equal to 1.8 MPa(G).

16. The process according to claim 1 or 2, wherein when the adsorption tower of the first stage is performing the two-end equalization depressurization step, less than 50% of the gas discharged from the equalization depressurization step is introduced from the bottom of the adsorption tower into the other adsorption tower which is performing the equalization repressurization step.

17. The process according to claim 16, wherein when the adsorption tower of the first stage is performing the two-end equalization depressurization step, 17-25% of the gas discharged from the equalization depressurization step is introduced from the bottom of the adsorption tower into the other adsorption tower which is performing the equalization repressurization step.

18. A two-stage complete recycle pressure-swing adsorption process for gas Separation, wherein the process is used to separate the strongly adsorbed component and the weakly adsorbed component from the gas mixture; the process adopts two-stage pressure-swing adsorption device operating in series; the gas mixture is fed into the first stage pressure-swing adsorption device, and the strongly adsorbed component of the gas mixture is adsorbed and is concentrated as product; the interim gas mixture from the outlet of the adsorption tower of the first stage pressure-swing adsorption device is fed into the second stage pressure-swing adsorption device; the strongly adsorbed component in the interim gas mixture is adsorbed further, and the nonadsorbed weakly adsorbed component acts as product and is fed into next step; the gas discharged from the adsorption tower which is in the first backward depressurization step BD1 in the first stage is returned into the adsorption tower of the first stage at the bottom to increase the pressure; all of the gas excepting for the weakly adsorbed component entering into next step in the second stage is returned into the first stage to increase the pressure of the adsorption tower; the adsorption tower of the first stage sequentially undergoes the following steps in one circulation period: adsorption step A, cocurrent equalization depressurization ED, first backward depressurization BD1, second backward depressurization BD2, first stage gas repressurization 2ER1, second stage gas repressurization 2ER, backward equalization repressurization ER and final repressurization FR; the adsorption tower of the second stage sequentially undergoes the following steps in one circulation period: adsorption A, cocurrent equalization depressurization ED, backward depressurization BD, backward equalization repressurization ER and final repressurization FR.

19. The process according to claim 18, wherein the adsorption tower of the first stage adds the evacuation step VC after the second backward depressurization step BD2 and/or the adsorption tower of the second stage adds the evacuation step VC after the backward depressurization step BD.

20. The process according to claim 18 or 19, wherein the adsorption tower of the second stage adds the first cocurrent depressurization step PP1 and the second cocurrent depressurization step PP2 and the third cocurrent depressurization step PP3 after the cocurrent equalization depressurization step ED; at the same time, the adsorption tower of the second stage adds the first purge step P1 and the second purge step P2 and the third purge step P3 after the backward depressurization step BD; the gas of the first purge step P1 comes from the adsorption tower which is in the third cocurrent depressurization step PP3 directly or comes from the buffer vessel V3 that is used to store the gas of the third cocurrent depressurization step PP3; the gas of the second purge step P2 comes from the adsorption tower which is in the second cocurrent depressurization step PP2 directly or comes from the buffer vessel V4 that is used to store the gas of the second cocurrent depressurization step PP2; the gas of the third purge step P3 comes from the adsorption tower which is in the first cocurrent depressurization step PP1 directly or comes from the buffer vessel V5 that is used to store the gas of the first cocurrent depressurization step PP1.

21. The process according to claim 18 or 19, wherein in the first stage, the average concentration of the strongly adsorbed components in the outlet gas of the adsorption step is over or equal to 2 v %.

22. The process according to claim 18 or 19, wherein the pressure of the raw material gas mixture is over or equal to 1.8 MPa(G).

23. The process according to claim 18 or 19, wherein in the first stage, the average concentration of the strongly adsorbed components in the gas mixture finally discharged from the adsorption tower after the first backward depressurization step BD1 is over 30%.

24. The process according to claim 23, wherein in the first stage, the average concentration of the strongly adsorbed components in the gas mixture finally discharged from the adsorption tower after the first backward depressurization step BD1 is over 80%.

25. The process according to claim 12 or 18, wherein the adsorbents in the adsorption tower of the first stage are activated alumina and fine-porous-silicagel; the activated alumina is packed at the bottom of the adsorption tower; the fine-porous-silicagel is packed at the top of the adsorption tower; the adsorbent in the adsorption tower of the second stage is fine-porous-silicagel only.

26. The process according to claim 1, 2 or 18, wherein the adsorbents in the adsorption tower of the first stage are activated alumina and fine-porous-silicagel, or activated alumina and activated carbon, or activated alumina and activated carbon and molecular sieve in sequence from the bottom up; the adsorbents in the adsorption tower of the second stage are activated carbon and molecular sieve, or molecular sieve.

27. The process according to claim 1, 2 or 18, wherein the adsorbents in the adsorption tower of the first stage are activated alumina and molecular sieve in sequence from the bottom up; the adsorbent in the adsorption tower of the second stage is molecular sieve.

28. The process according to claim 1, 2 or 18, wherein the adsorbents in the adsorption tower of the first stage are activated alumina and molecular sieve in sequence from the bottom up; the adsorbent in the adsorption tower of the second stage is molecular sieve.

* * * * *

UNITED STATES PATENT AND TRADEMARK OFFICE
CERTIFICATE OF CORRECTION

PATENT NO. : 8,545,601 B2
APPLICATION NO. : 11/570312
DATED : October 1, 2013
INVENTOR(S) : Yuwen Song It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1752 days.

Signed and Sealed this
Fifteenth Day of September, 2015

Michelle K. Lee
*Director of the United States Patent and Trademark Office*